US009603175B2

(12) United States Patent
Baek et al.

(10) Patent No.: US 9,603,175 B2
(45) Date of Patent: Mar. 21, 2017

(54) APPARATUS AND METHOD FOR SWITCHING BETWEEN DEFAULT PATH AND DIRECT PATH IN WIRELESS COMMUNICATION SYSTEM

(71) Applicant: Samsung Electronics Co., Ltd., Gyeonggi-do (KR)

(72) Inventors: Sang-Kyu Baek, Gyeonggi-do (KR); Ki-Suk Kweon, Gyeonggi-do (KR); Young-Bin Chang, Gyeonggi-do (KR); Kyung-Kyu Kim, Gyeonggi-do (KR); Hyun-Seok Ryu, Gyeonggi-do (KR); Seung-Hoon Park, Seoul (KR); Sung-Jin Lee, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 53 days.

(21) Appl. No.: 14/322,873

(22) Filed: Jul. 2, 2014

(65) Prior Publication Data
US 2015/0009915 A1 Jan. 8, 2015

(30) Foreign Application Priority Data
Jul. 2, 2013 (KR) .......................... 10-2013-0076928

(51) Int. Cl.
*H04W 76/02* (2009.01)
*H04W 36/00* (2009.01)

(52) U.S. Cl.
CPC ......... *H04W 76/023* (2013.01); *H04W 36/00* (2013.01)

(58) Field of Classification Search
CPC ............................ H04W 36/00; H04W 76/023
See application file for complete search history.

(56) References Cited

U.S. PATENT DOCUMENTS

| 2010/0260101 | A1 | 10/2010 | Tsirtsis et al. | |
|---|---|---|---|---|
| 2013/0150058 | A1 | 6/2013 | Lim et al. | |
| 2013/0287012 | A1* | 10/2013 | Pragada | H04W 76/045 370/338 |
| 2014/0010209 | A1 | 1/2014 | Hakola et al. | |
| 2014/0162633 | A1* | 6/2014 | Hwang | H04W 76/023 455/426.1 |

(Continued)

FOREIGN PATENT DOCUMENTS

| KR | 10-2009-0005601 | 1/2009 |
|---|---|---|
| WO | WO 2012/025670 A1 | 3/2012 |

(Continued)

OTHER PUBLICATIONS

3GPP TR 22.803 v12.2.0 (Jun. 2013).*

(Continued)

*Primary Examiner* — Jae Y Lee

(57) ABSTRACT

A method for controlling a path between terminals in a wireless communication system includes measuring a channel quality of a direct path with the another terminal when receiving a request for measuring the channel quality of the direct path from a higher entity, transmitting a first message comprising a result of the measuring the channel quality to the higher entity, and, when receiving a second message to instruct to switch to the direct path from the higher entity, setting the direct path with the another terminal. another embodiments including a terminal and a network entity are also disclosed.

48 Claims, 17 Drawing Sheets

(56) References Cited

U.S. PATENT DOCUMENTS

| | | | |
|---|---|---|---|
| 2014/0179330 A1 | 6/2014 | Du et al. | |
| 2014/0185587 A1 | 7/2014 | Jang et al. | |
| 2014/0194115 A1* | 7/2014 | Yang | H04W 4/008 455/426.1 |
| 2014/0254523 A1* | 9/2014 | Chai | H04W 76/02 370/329 |
| 2014/0308954 A1 | 10/2014 | Wang et al. | |
| 2015/0124735 A1* | 5/2015 | Cho | H04W 76/043 370/329 |
| 2015/0208452 A1* | 7/2015 | Lee | H04W 36/0061 455/426.1 |

FOREIGN PATENT DOCUMENTS

| | | |
|---|---|---|
| WO | WO 2013/013510 A1 | 1/2013 |
| WO | WO 2013/093412 A1 | 1/2013 |
| WO | WO 2013/032259 A2 | 3/2013 |

OTHER PUBLICATIONS

International Search Report dated Oct. 28, 2014 in connection with International Application No. PCT/KR2014/005878; 3 pages.
Written Opinion of International Searching Authority dated Oct. 28, 2014 in connection with International Application No. PCT/KR2014/005878; 7 pages.

* cited by examiner

APPARATUS AND METHOD FOR SWITCHING BETWEEN DEFAULT PATH AND DIRECT PATH IN WIRELESS COMMUNICATION SYSTEM

PRIORITY

The present application is related to and claims priority under 35 U.S.C. §119 to an application filed in the Korean Intellectual Property Office on Jul. 2, 2013 and assigned Serial No. 10-2013-0076928, the contents of which are incorporated herein by reference.

TECHNICAL FIELD

The present disclosure relates to controlling a path between user devices in a wireless communication system.

BACKGROUND

As mobile services have evolved in recent years, a variety of service models utilizing smart phones have been developing. Among these, some service uses proximity of users. Use of a cellular network to provide such a service may cause data congestion as the number of users increases. To solve the problems caused by the data congestion, the device-to-device communication (D2D) technology using proximity of communication terminals has been proposed.

The D2D communication may be performed between terminals to use radio resources effectively, and a whole network throughput may increase due to direct path communication performed by the D2D communication. However, when a distance between communication terminals is relatively great, the D2D communication is inefficient due to deterioration in the quality of radio channels and thus communicating via a default path of the cellular network is more efficient. Therefore, it is preferable that the direct path switches to the default path according to the quality of radio channels between terminals. In addition, since the cellular network should guarantee mobility of terminals, it may be necessary to switch between the default path and the direct path when the terminal moves.

Therefore, there is a need for an effective method for switching between a default path and a direct path by considering a state of a terminal.

SUMMARY

To address the above-discussed deficiencies, it is a primary object to provide an apparatus and method for switching between a default path and a direct path in a wireless communication system.

Another aspect of the present disclosure is to provide an apparatus and method for switching between a default path and a direct path under control of a network in a wireless communication system.

Another aspect of the present disclosure is to provide an apparatus and method for performing signaling to switch between a default path and a direct path in a wireless communication system.

According to an aspect of the present disclosure, a method for operating a terminal in a wireless communication system includes measuring a channel quality of a direct path with the other terminal, transmitting a first message including a result of the measuring the channel quality to a higher entity, receiving a second message to instruct to switch to the direct path from the higher entity, and setting the direct path with the other terminal.

According to another aspect of the present disclosure, a method for operating a network entity which controls a path switch between terminals in a wireless communication system includes receiving a first message to notify that two terminals are a candidate pair which is able to communicate via a direct path, adding the pair of the two terminals to D2D pair candidate information as a candidate; and transmitting a second message to request to measure a channel quality of the direct path between the two terminals.

According to another aspect of the present disclosure, an apparatus for a terminal in a wireless communication system includes a controller for measuring a channel quality of a direct path with the other terminal, a transmitter for transmitting a first message including a result of the measuring the channel quality to a higher entity, and a receiver for receiving a second message to instruct to switch to the direct path from the higher entity, wherein the controller sets the direct path with the other terminal after receiving the second message.

According to another aspect of the present disclosure, an apparatus for a network entity for controlling a path switch between terminals in a wireless communication system includes: a receiver for receiving a first message to notify that two terminals are a candidate pair which is able to communicate via a direct path; a controller for adding the pair of the two terminals to D2D pair candidate information as a candidate, and a transmitter for transmitting a second message to request to measure a channel quality of the direct path between the two terminals.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

Hereinafter, a technology for switching between a default path and a direct path in a wireless communication system according to exemplary embodiments of the present disclosure will be explained.

In the following descriptions, terms and names defined in the $3^{rd}$ Generation Partnership Project Long Term Evolution (3GPP LTE) standards will be used. However, the present disclosure is not limited to those terms and names and can be equally applied to systems according to different standards.

Figure 1:
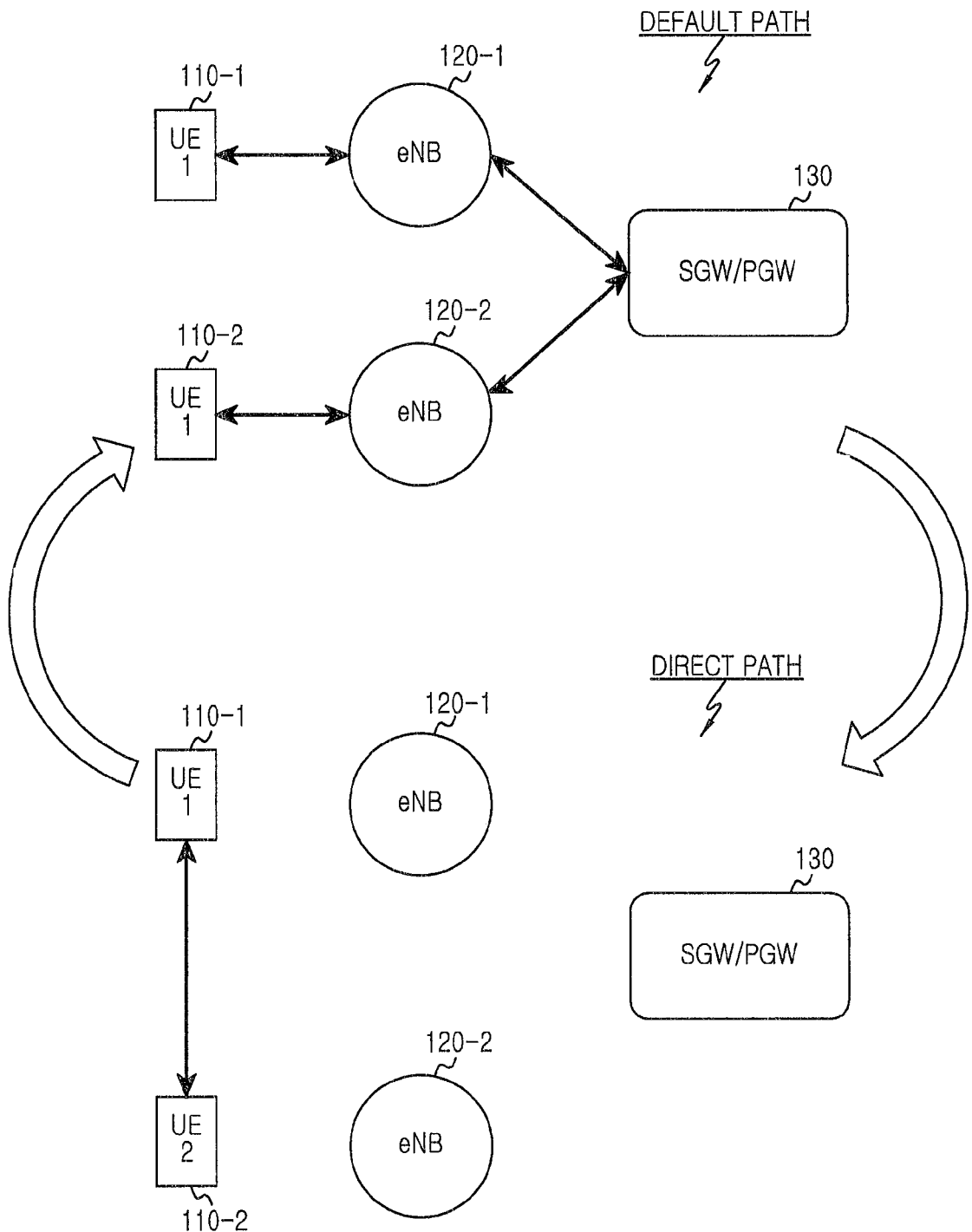
FIG. 1 illustrates communication paths between terminals in a wireless communication system according to an exemplary embodiment of the present disclosure.

FIG. 1 illustrates communication paths between terminals in a wireless communication system according to an exemplary embodiment of the present disclosure.

Referring to FIG. 1, User Equipment (UE)1 110-1 and UE2 110-2 communicate with each other via one of the two paths. First, the UEs 110 exchange data with each other via evolved Nodes B (eNBs) 120 and a Serving GateWay (S-GW)/Packet data network GateWay (P-GW) 130 as a default path. Alternatively, the UEs 110 can directly exchange data with each other via a radio channel as a direct path, without passing through the eNBs 120 and the S-GW/P-GW 130.

According to an exemplary embodiment of the present disclosure, the UEs 110 can switch between the direct path and the default path. In particular, a system according to an exemplary embodiment of the present disclosure can support a seamless service even when the UEs 110 switches between the paths.

Figure 2:
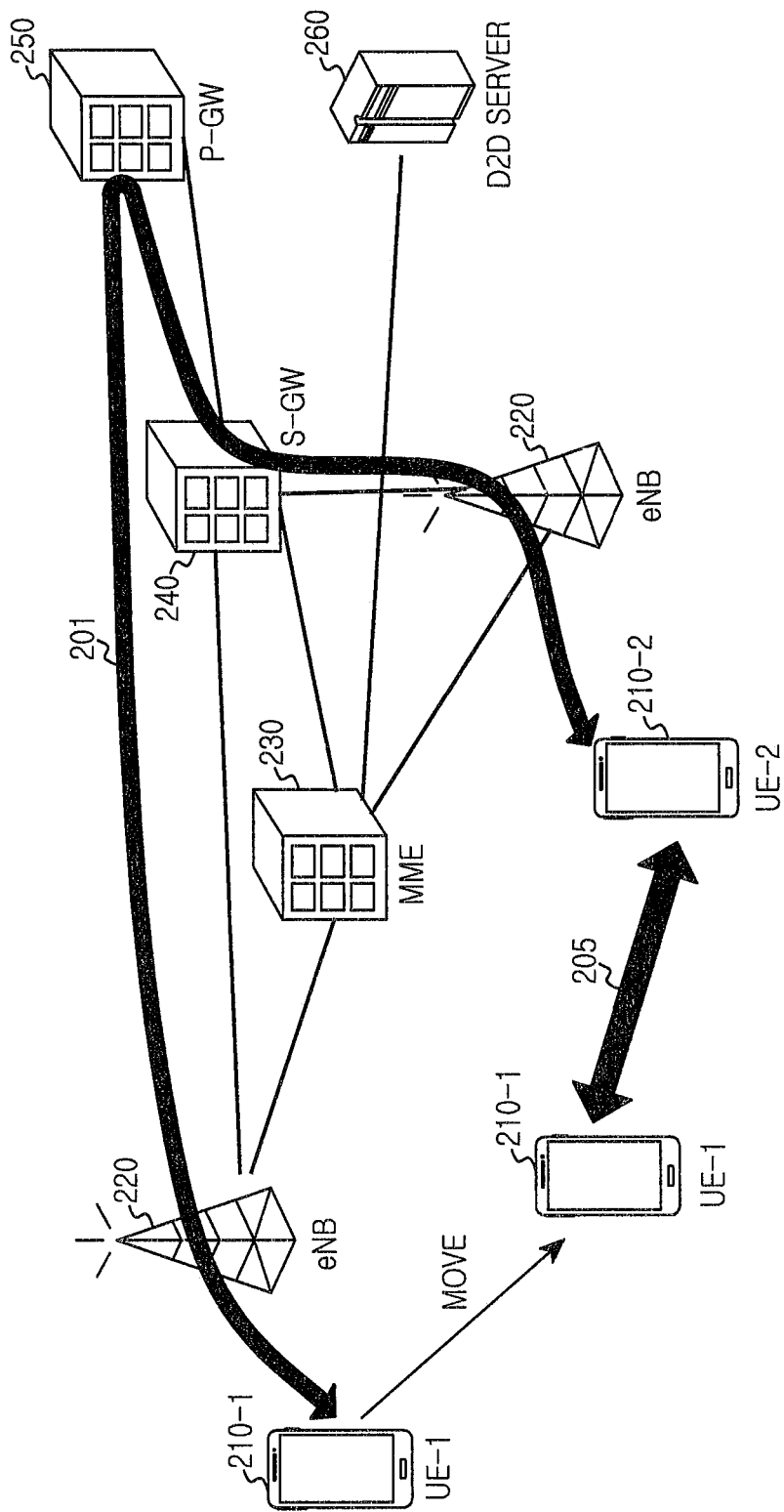
FIG. 2 illustrates a schematic configuration of a wireless communication system according to an exemplary embodiment of the present disclosure.

FIG. 2 illustrates a schematic configuration of a wireless communication system according to an exemplary embodiment of the present disclosure.

Referring to FIG. 2, UE1 210-1 and UE2 210-2 communicate with each other. In addition, a network includes eNBs 220, a Mobile Management Entity (MME) 230, an S-GW 240, and a P-GW 250. In addition, according to an exemplary embodiment of the present disclosure, the network can further include a D2D server 260. In FIG. 2, the D2D server 260 can be configured as a separate entity. However, according to another exemplary embodiment of the present disclosure, the D2D server 260 can be configured as a part of another entity. For example, the D2D server 260 can be included in the MME 230.

The UEs 210 refer to user devices. The UEs 210 can be smart phones or devices designed only for data communication. The UEs 210 can include a communicating means for communicating at a D2D frequency, a communicating means for communicating at a cellular frequency, and a frequency change switch.

The UEs 210 can perform D2D communication by using the communicating means for communicating at the D2D frequency. The D2D communication can be utilized for a service that directly transmits data between the UEs 210, unlike existing data communication in which all traffics pass through a server existing in the Internet. The D2D communication can use a radio frequency band of a cellular network unlike existing services such as Bluetooth, Wireless Personal Area Network (WPAN), etc., and can coexist with the cellular network to be able to provide an improved service quality. In addition, the D2D communication can be combined with a D2D discovery technology so that direct data communication is possible between application program users located in proximity with each other.

The eNBs 220 support connection between the UEs 210 and the network by providing wireless access to the UEs 210. The MME 230 manages mobility of the UEs 210. That is, the MME 230 grasps which cell the UEs 210 are located in and which Tracking Area (TA) the UEs 210 are located in. In addition, the MME 230 can further perform authentication or bearer management for the UEs 210. The S-GW 240 processes a packet which arrives from the eNB 220 or a packet to be forwarded to the eNB 220. In addition, the S-GW 240 can serve as an anchor during inter-eNB handovers of the UEs 210. The P-GW 250 can serve as a connection point with an external network (e.g., the Internet). In addition, the P-GW 250 allocates Internet Protocol (IP) addresses to the UEs 210 and serves as an anchor for the S-GW 240. In addition, the P-GW 250 can apply Quality of Service (QoS) policy of the UEs 210 and can manage account data.

The D2D server 260 controls switching between a default path and a direct path between the UEs 210. To achieve this, the D2D server 260 can store a D2D session situation and location information of a D2D pair. In addition, the D2D server 260 can acquire communication information of the D2D pair from the P-GW 260. For example, the communication information includes information on whether the UEs 210 belong to the same S-GW or not. In addition, the D2D server 260 can acquire serving eNB 220 information and TA information of each of the UEs 210 from the MME 230. Based on the above-described information, the D2D server 260 determines whether it is possible to switch from the default path to the direct path. In this case, the D2D server 260 can request a channel report on the direct path. When requesting the channel report, the D2D server 260 can transmit the request to the eNB 220 or can directly transmit the request to the UEs 210. According to another exemplary embodiment of the present disclosure, when a D2D pair belonging to the same eNB or neighboring eNBs performs communication, the MME 230 can request the MME 230 to measure and report on a channel condition of the direct path.

The D2D server 260 manages information on communication paths of the UEs 210. For example, the information on the communication paths can be configured as shown in table 1:

TABLE 1

| Pair # | Bearer ID1 | Bearer ID2 | eNB ID1 | eNB ID2 | TA ID1 | TA ID2 | PATH |
|---|---|---|---|---|---|---|---|
| 1 | b1 | b2 | eNB1 | eNB2 | TA1 | TA1 | direct |
| 2 | b3 | b4 | eNB3 | eNB3 | TA1 | TA1 | default |
| 3 | b5 | b6 | eNB1 | eNB1 | TA1 | TA1 | direct |
| 4 | b7 | b8 | eNB1 | eNB4 | TA1 | TA1 | direct |

Table 1 can be referred to as 'D2D pair candidate information' or 'D2D management information'. The D2D pair candidate information is information on UEs which perform D2D communication or are able to do so, and includes information on what UE pair is a candidate that is able to communicate via the direct path, what UE pair is currently communicating via the direct path, etc. In table 1, pair #1 and pair #2 are candidates that are able to perform D2D communication, and pair #3 and pair #4 are UEs which are in the process of performing D2D communication.

The D2D server 260 is notified by the P-GW 250 that the UEs 210 belonging to the same S-GW 240 are in the process of communicating with each other and then adds a UE pair including the UEs 210 to the D2D pair candidate information. Thereafter, the D2D server 260 continuously manages the D2D pair candidate information every time handover of each of the UEs 210 is performed or a Radio Resource Control (RRC)-idle/connected state is changed. All of the functions of the D2D server 260 can be performed by the eNB 220 or the MME 230.

Hereinafter, the names of the network entities described above with reference to FIG. 2 will be used. However, according to an exemplary embodiment, the UE can be referred to as a 'terminal', a 'mobile station', or a 'mobile terminal', and the eNB can be referred to as a 'base station'.

Figure 3:
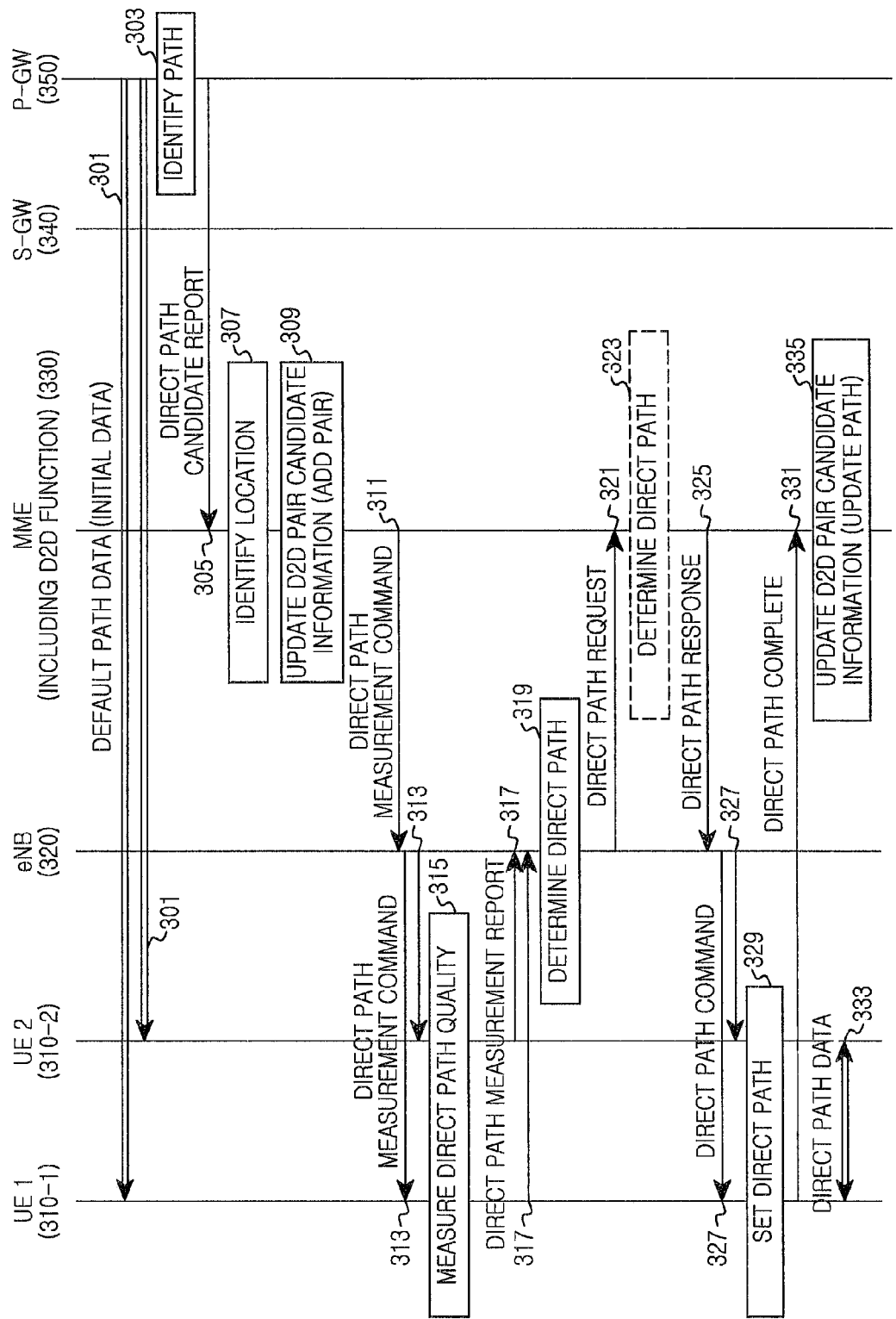
FIG. 3 illustrates a signaling for switching a communication path in a wireless communication system according to an exemplary embodiment of the present disclosure.

FIG. 3 illustrates signaling for switching a communication path in a wireless communication system according to an exemplary embodiment of the present disclosure. FIG. 3 illustrates a case in which UEs having the same serving eNB switch from a default path to a direct path, and illustrates an exemplary embodiment in which functions of a D2D server are included in an MME.

Referring to FIG. 3, in step 301, UE1 310-1 and UE2 310-2 initially communicate with each other via a default path passing through an eNB 320, an MME 330, an S-GW 340, and a P-GW 350. That is, the UE1 310-1 and the UE2 310-2 are in an RRC-connected state and exchange data with each other via the default path.

In step 303, the P-GW 350 identifies the communication path of the UE1 310-1 and the UE2 310-2. Since the P-GW 350 serves to forward packets of the UE1 310-1 and the UE2 310-2 to an external network, the P-GW 350 can know that the UE1 310-1 and the UE2 310-2 communicate with each other and belong to the S-GW 340. In this case, the P-GW 350 identifies that the packets exchanged between the UE1 310-1 and the UE2 310-2 are not transmitted to the external network.

In step 305, the P-GW 350 transmits a direct path candidate report message to the MME 330. That is, the P-GW 350 notifies the MME 330 equipped with D2D functions that both the UE1 310-1 and the UE2 310-2 perform communication within the S-GW 340. The direct path candidate report message can include a bearer ID between the UE1 310-1 and the P-GW 340, an Evolved Packet System (EPS) bearer ID for the UE1 310-1, a bearer ID between the UE2 310-2 and the P-GW 340 and an EPS bearer ID for the UE2 310-2, or, can include an International Mobile Subscriber Identity (IMSI) of each of the UE1 310-1 and the UE2 310-2 as an identifier of the UE. The direct path candidate report message can include a dedicated D2D ID which is used only for direct path communication or another identifier of the UE which is known to both the MME 330 and the P-GW 350.

In step 307, the MME 330 identifies locations of the UE1 310-1 and the UE2 310-2, namely, serving eNBs of the UE1 310-1 and the UE2 310-2. Since the MME 330 manages mobility of UEs, the MME 330 can know that the UE1 310-1 and the UE2 310-2 belong to the eNB 320.

In step 309, the MME 330 updates D2D pair candidate information. Specifically, as the MME 330 knows that both the UE1 310-1 and the UE2 310-2 belong to the eNB 320, the MME 330 adds the UE1 310-1 and the U2 310-2 as a D2D pair candidate. In other words, the MME 330 updates with the information indicating that the UE1 310-1 and the UE2 310-2 communicate with each other. In this case, in the D2D pair candidate information, the communication path between the UE1 310-1 and the UE2 310-2 is set as the default path.

In step 311, the Mobile Management Entity (MME) 330 determines that the UE1 310-1 and the UE2 310-2 are able to communicate with each other via the direct path and transmits a direct path measurement command message on the UE1 310-1 and the UE2 310-2 to the eNB 320. The direct path measurement command message can include at least one of an eNB S1 Application Protocol (AP) UE ID, an MME S1 Application Protocol (S1AP) UE ID, an EPS bearer ID, and an E-RAB (E-UTRAN Radio Access Bearer) ID of the UE1 310-1 and the UE2 310-2 in order for the eNB 320 and the MME 330 to identify the UE1 310-1 and the UE2 310-2. In addition, the direct path measurement command message can include a dedicated D2D ID which is used only for the direct path communication or another identifier of the UE which is known to both the MME 330 and the P-GW 350.

In step 313, the eNB 320 transmits the direct path measurement command message to instruct to measure a channel state of the direct path to each of the UE1 310-1 and the UE2 310-2. The direct path measurement command message transmitted from the eNB 320 can include at least one of resource allocation information necessary for measuring the channel state, a resource allocation time, a reference signal code, a direct path measurement report message generating condition, and resource information to be used for transmitting a direct path measurement report message. For example, the direct path measurement report message generating condition includes a condition that at least one designated from among received power of a reference signal, a Signal to Interference Ratio (SIR), and a Signal to Interference and Noise Ratio (SINR) exceeds a threshold value.

In step 315, the UE1 310-1 and the U2 310-2 each measure a channel state of the direct path with the other. To achieve this, the eNB 320 can allocate radio resources for measuring the channel. For example, the UE1 310-1 and the UE2 310-2 each can measure the channel state by using a signal of a pre-defined value transmitted from the other.

In step 317, the UE1 310-1 and the UE2 310-2 each transmit a direct path measurement report indicating the channel state of the direct path to the eNB 320. The direct path measurement report includes direct path quality information which is measured in step 315. For example, the direct path quality information can include at least one of received power of a reference signal, an SIR, and an SINR. In addition, the direct path measurement report can include a reporting condition which is designated by the direct path measurement command received from the eNB 320. To achieve this, the eNB 320 can allocate radio resources for transmitting the result of the measuring.

In step 319, the eNB 320 determines to switch the path of the UE1 310-1 and the UE2 310-2 to the direct path. That is, the eNB 320 determines to switch to the direct path based on the channel state of the direct path reported by the UE1 310-1 and the UE2 310-2 and a current network condition (e.g., a cellular network capacity, the number of connected UEs, and an estimated throughput, etc.). For example, the eNB 320 can determine to switch to the direct path when the channel quality of the direct path exceeds a pre-defined threshold value.

In step 321, the eNB 320 transmits a direct path request to the MME 330 according to the determination to switch to the direct path. That is, the eNB 320 requests the MME 330 to switch to the direct path. The direct path request message can include at least one of an eNB S1AP UE ID, an MME S1AP UE ID, an EPS bearer ID, and an E-RAB ID of the UE1 310-1 and the UE2 310-2 in order for the eNB 320 and the MME 330 to identify the UE1 310-1 and the UE2 310-2. In addition, the direct path request message can include a dedicated D2D ID which is used only for the direct path communication or another identifier of the UI which is known to both the MME 330 and the P-GW 350. Furthermore, the direct path request message can further include information included in the direct path measurement report message, for example, received power of a reference signal, an SIR, an SINR, and a reporting condition which is designated by the direct path measurement command received from the eNB 320.

In step 323, the MME 330 determines whether to switch to the direct path again. In this case, the MME 330 can determine whether to switch to the direct path based on the same information as in the eNB 320. According to another exemplary embodiment, the MME 330 can approve the request of the eNB 320 without determining whether to switch to the direct path again.

In step 325, the MME 330 transmits a direct path response to the eNB. 320. The direct path response message can include at least one of an eNB S1AP UE ID, an MME S1AP UE ID, an EPS bearer ID, and an E-RAB ID of the UE1 310-1 and the UE2 310-2 in order for the eNB 320 and the MME 330 to identify the UE1 310-1 and the UE2 310-2. In addition, the direct path response message can include a dedicated D2D ID which is used only for the direct path communication or another identifier of the UE which is known to both the MME 330 and the P-GW 350.

In step 327, the eNB 320 transmits a direct path command message to the UE1 310-1 and the U2 310-2. The direct path command message can include at least one of a D2D ID to be used in the direct path, a D2D ID of the other UE, a subframe offset informing a start point of the direct path communication, a D2D bearer ID for using the direct path, and a Packet Data Convergence Protocol (PDCP) sequence number to be used.

In step 329, the UE1 310-1 and the UE2 310-2 set the direct path. For example, the UE1 310-1 and the UE2 310-2 can exchange a D2D security key with each other, set the D2D bearer ID and synchronization and a timing offset between the UEs 310, synchronize an RLC sequence number, and set initial values of other necessary parameters such as a Modulation and Coding Scheme (MCS), etc.

In step 331, the UE1 310-1 and the UE2 310-2 transmit a direct path complete message to the MME 330 via the eNB 320. The direct path complete message can be transmitted in the form of a Non Access Stratum (NAS) message which is directly communicated to the MME 330. If the eNB 320 needs to know that the direct path is set, the UE1 310-1 and the UE2 310-2 transmit the direct path complete message to the eNB 320 in the form of an RRC message and then the eNB 320 transmits the direct path complete message to the MME 330 according to the S1-AP protocol. The direct path complete message can include at least one of an indicator informing that the direct path has been set, a D2D ID of at least one of the UE1 310-1 and the UE2 310-2, and an EPS bearer ID used in the default path.

In step 333, the UE1 310-1 and the UE2 310-2 communicate with each other via the direct path. In this case, since the default path is not used, the UE1 310-1 and the UE2 310-2 can transit to the RRC-idle state. When the UE1 310-1 and the UE2 310-2 transit to the idle state, unnecessary power consumption of the UE1 310-1 and the UE2 310-2 can be prevented.

In step 335, the MME 330 updates D2D candidate pair information. Specifically, the MME 330 updates with the information indicating that the UE1 310-1 and the UE2 310-2 communicate with each other via the direct path.

In the exemplary embodiment of FIG. 3, the UE1 310-1 and the UE2 310-2 can use an IP address to communicate with each other via the direct path. To achieve this, the UE1 310-1 and the UE2 310-2 can be allocated an IP address to be used in the direct path communication by an IP address allocating device in the initial accessing process. The IP address allocating device can be the P-GW 350. When a unique IP address for each terminal such as IP version 6 (IPv6) is allocated, the same IP address can be used regardless of which path is used. When the IP address is changed in the P-GW 350, the UE1 310-1 and the UE2 310-2 should be allocated the IP address for each path in the initial accessing process.

Figure 4:
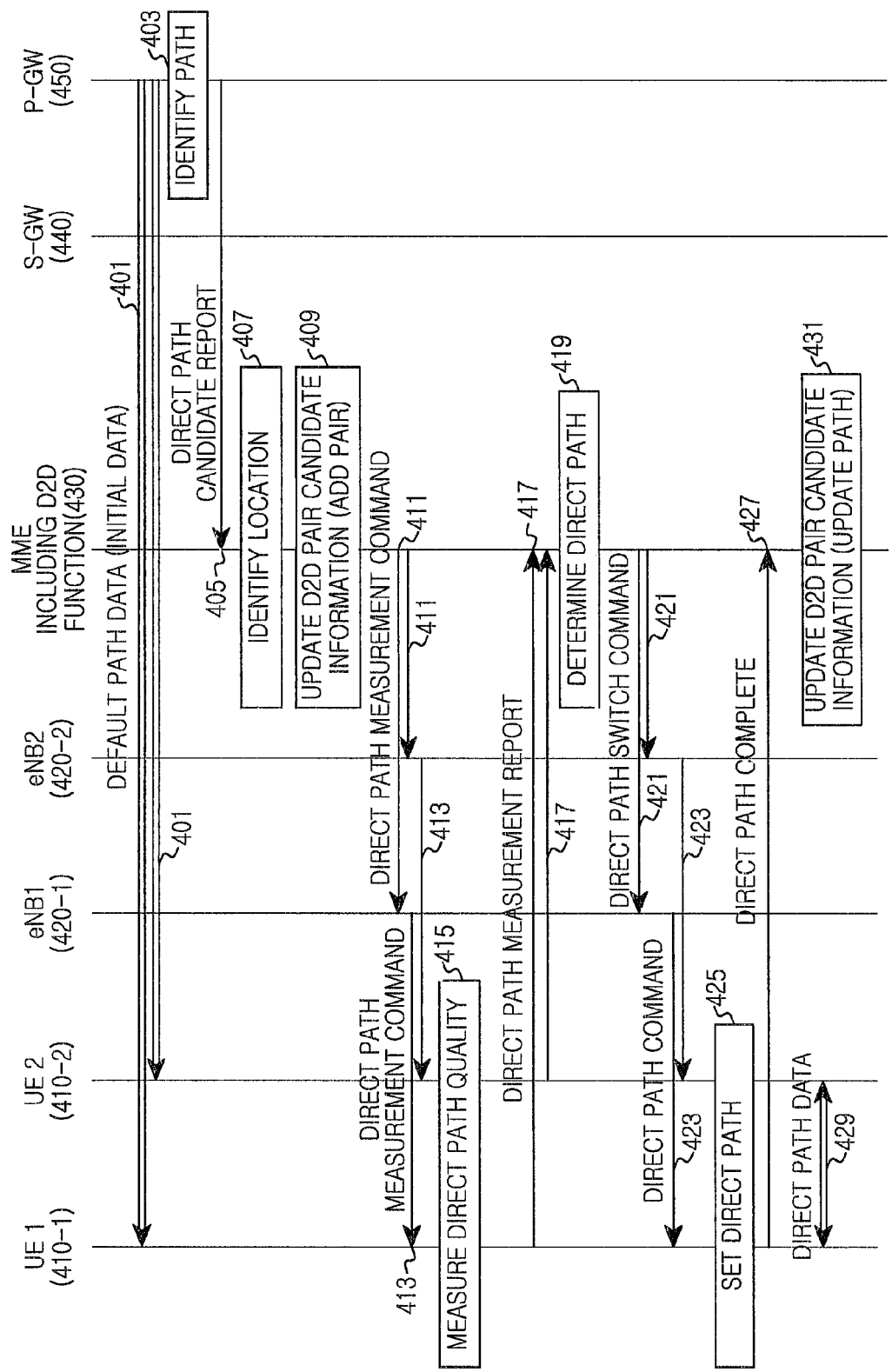
FIG. 4 illustrates a signaling for switching a communication path in a wireless communication system according to another exemplary embodiment of the present disclosure.

FIG. 4 illustrates signaling for switching a communication path in a wireless communication system according to another exemplary embodiment of the present disclosure. FIG. 4 illustrates a case in which UEs having different serving eNBs switch from a default path to a direct path, and illustrates an exemplary embodiment in which functions of a D2D server are included in an MME.

Referring to FIG. 4, in step 401, UE1 410-1 and UE2 410-2 initially communicate with each other via a default path passing through an eNB1 420-1, an eNB 420-2, an MME 430, an S-GW 440, and a P-GW 450. That is, the UE1 410-1 and the UE2 410-2 are in an RRC-connected state and exchange data with each other via the default path.

In step 403, the P-GW 450 identifies the communication path of the UE1 410-1 and the UE2 410-2. Since the P-GW 450 serves to forward packets of the UE1 410-1 and the UE2 410-2 to an external network, the P-GW 450 can know that the UE1 410-1 and the UE2 410-2 communicate with each other and belong to the S-GW 440. In this case, the P-GW 450 identifies that the packets exchanged between the UE1 410-1 and the UE2 410-2 are not transmitted to the external network.

In step 405, the P-GW 450 transmits a direct path candidate report message to the MME 430. That is, the P-GW 450 notifies the MME 430 equipped with D2D functions that both the UE1 410-1 and the UE2 410-2 perform communication within the S-GW 440. The direct path candidate report message can include a bearer ID between the UE1 410-1 and the P-GW 440, an EPS bearer ID for the UE1 410-1, a bearer ID between the UE2 410-2 and the P-GW 440 and an EPS bearer ID for the UE2 410-2, or, can include an IMSI of each of the UE1 410-1 and the UE2 410-2 as an identifier of the UE. The direct path candidate report message can include a dedicated D2D ID which is used only for the direct path communication or another identifier of the UE which is known to both the MME 430 and the P-GW 450.

In step 407, the MME 330 identifies locations of the UE1 410-1 and the UE2 410-2, namely, serving eNBs of the UE1 410-1 and the UE2 410-2. Since the MME 430 manages mobility of UEs, the MME 330 can know that the UE1 410-1 belongs to the eNB1 420-1 and the UE2 410-2 belongs to the eNB2 420-2.

In step 409, the MME 430 updates D2D pair candidate information. Specifically, as the MME 430 knows that the UE1 410-1 and the UE2 410-2 belong to their respective neighboring eNBs 420, the MME 430 adds the UE1 410-1 and the U2 410-2 as a D2D pair candidate. In other words, the MME 430 updates with the information indicating that the UE1 410-1 and the UE2 410-2 communicate with each other. In this case, in the D2D pair candidate information, the communication path between the UE1 410-1 and the UE2 410-2 is set as the default path.

In step 411, the MME 430 determines that the UE1 410-1 and the UE2 410-2 are able to communicate with each other via the direct path and transmits a direct path measurement command message on the UE1 410-1 and the UE2 410-2 to the eNB1 420-1 and the eNB2 420-2. The direct path measurement command message can include at least one of an eNB S1AP UE ID, an MME S1AP UE ID, an EPS bearer ID, and an E-RAB ID of the UE1 410-1 and the UE2 410-2 in order for the eNBs 420 and the MME 330 to identify the UE1 410-1 and the UE2 410-2. In addition, the direct path measurement command message can include a dedicated D2D ID which is used only for the direct path communication or another identifier of the UE which is known to both the MME 430 and the P-GW 450.

In step 413, the eNB1 420-1 and the eNB2 420-2 transmit the direct path measurement command message to instruct to measure a channel state of the direct path to the UE1 410-1 and the UE2 410-2, respectively. The direct path measurement command message transmitted from the eNBs 420 can include at least one of resource allocation information necessary for measuring the channel state, a resource allocation time, a reference signal code, a direct path measurement report message generating condition, and resource information to be used for transmitting the direct path measurement report message. For example, the direct path measurement report message generating condition includes a condition that at least one designated from among received power of a reference signal, an SIR, and an SINR exceeds a threshold value.

In step 415, the UE1 410-1 and the UE2 410-2 each measure a channel state of the direct path with the other. To achieve this, the eNB1 420-1 and the eNB2 420-2 can allocate radio resources for measuring the channel. For example, the UE1 410-1 and the UE2 410-2 each can measure the channel state by using a signal of a pre-defined value transmitted from the other.

In step 417, the UE1 410-1 and the UE2 410-2 each transmit a direct path measurement report indicating the channel state of the direct path to the MME 430 via the eNB1 420-1 and the eNB2 420-2. The direct path measurement report includes the direct path quality information which is measured in step 415. For example, the direct path quality information can include at least one of received power of a reference signal, an SIR, and an SINR. In addition, the direct path measurement report can include a reporting condition which is designated by the direct path measurement command received from the eNBs 420. To achieve this, the eNB1 420-1 and the eNB2 420-2 can allocate radio resources for transmitting the result of the measuring. Since the serving eNBs of the UE1 410-1 and the UE2 410-2 are different unlike in the exemplary embodiment illustrated in FIG. 3, the MME 430 determines whether to switch to the direct path.

In step 419, the MME 430 determines to switch to the direct path. That is, the MME 430 determines to switch to the direct path based on the channel state of the direct path reported by the UE1 410-1 and the UE2 410-2 and a current network condition (e.g., a cellular network capacity, the number of connected UEs, and an estimated throughput, etc.). For example, the MME 430 can determine to switch to the direct path when the channel quality of the direct path exceeds a pre-defined threshold value.

In step 421, the MME 430 transmits a direct path switch command to each of the eNB1 420-1 and the eNB2 420-2. The direct path switch command message can include at least one of an indicator which instructs to switch to the direct path, and an MME S1AP UE ID, an EPS bearer ID, and an E-RAB ID of the UE1 410-1 and the UE2 410-2.

In step 423, the eNB1 420-1 and the eNB2 420-2 transmit a direct path command message to the UE1 410-1 and the UE2 410-2. The direct path command message can include at least one of a D2D ID to be used in the direct path, a D2D ID of the other UE, a subframe offset informing a start point of the direct path communication, a D2D bearer ID for using the direct path, and a PDCP sequence number to be used.

In step 425, the UE1 410-1 and the UE2 410-2 set the direct path. For example, the UE1 410-1 and the UE2 410-2 can exchange a D2D security key with each other, set the D2D bearer ID and synchronization and a timing offset between the UEs 410, synchronize an RLC sequence number, and set initial values of other necessary parameters such as an MCS, etc.

In step 427, the UE1 410-1 and the UE2 410-2 transmit a direct path complete message to the MME 430 via the eNB1 420-1 and the eNB2 420-2. The direct path complete message can be transmitted in the form of an NAS message which is directly communicated to the MME 430. When the eNBs 420 needs to know that the direct path is set, the UE1 410-1 and the UE2 410-2 transmit the direct path complete message to the eNBs 420 in the form of an RRC message and then the eNBs 420 transmit the direct path complete message to the MME 430 according to the S1-AP protocol. The direct path complete message can include at least one of an indicator informing that the direct path has been set, a D2D ID of at least one of the UE1 410-1 and the UE2 410-2, and an EPS bearer ID used in the default path.

In step 429, the UE1 410-1 and the UE2 410-2 communicate with each other via the direct path. In this case, since the default path is not used, the UE1 410-1 and the UE2 410-2 can transit to the RRC-idle state. When the UE1 410-1 and the UE2 410-2 transit to the idle state, unnecessary power consumption of the UE1 410-1 and the UE2 410-2 can be prevented.

In step 431, the MME 430 updates D2D candidate pair information. Specifically, the MME 430 updates with the information indicating that the UE1 410-1 and the UE2 410-2 communicate with each other via the direct path.

Figure 5:
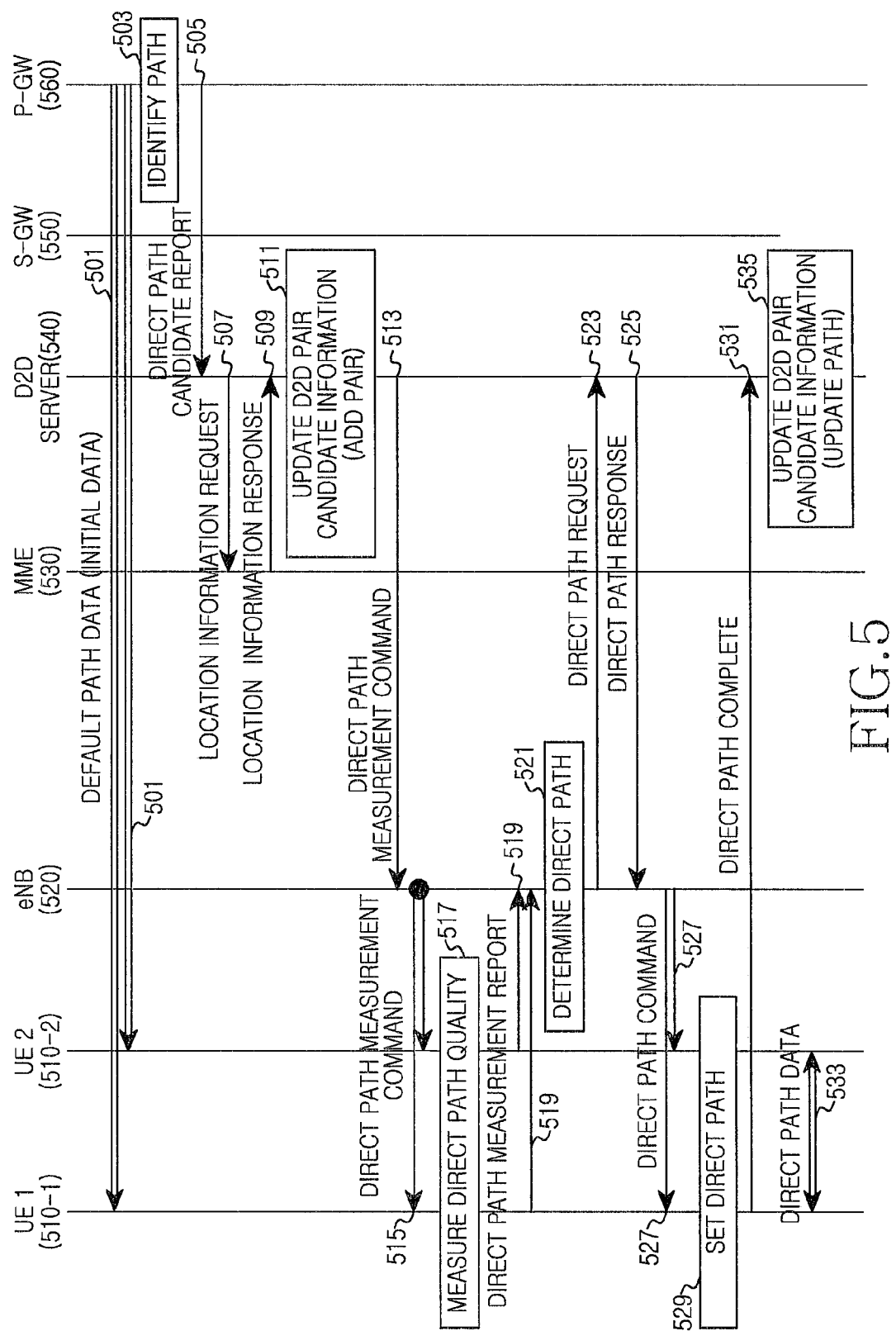
FIG. 5 illustrates a signaling for switching a communication path in a wireless communication system according to another exemplary embodiment of the present disclosure.

FIG. 5 illustrates signaling for switching a communication path in a wireless communication system according to another exemplary embodiment of the present disclosure. FIG. 5 illustrates a case in which UEs having the same serving eNB switch from a default path to a direct path, and illustrates an exemplary embodiment in which a D2D server is configured as a separate entity.

Referring to FIG. 5, in step 501, UE1 510-1 and UE2 510-2 initially communicate with each other via a default path passing through an eNB 520, an MME 530, an S-GW 540, and a P-GW 550. That is, the UE1 510-1 and the UE2 510-2 are in an RRC-connected state and exchange data with each other via the default path.

In step 503, the P-GW 550 identifies the communication path of the UE1 510-1 and the UE2 510-2. Since the P-GW 550 serves to forward packets of the UE1 510-1 and the UE2 510-2 to an external network, the P-GW 550 can know that the UE1 510-1 and the UE2 510-2 communicate with each other and belong to the S-GW 540. In this case, the P-GW 550 identifies that the packets exchanged between the UE1 510-1 and the UE2 510-2 are not transmitted to the external network.

In step 505, the P-GW 550 transmits a direct path candidate report message to a D2D server 560. That is, the P-GW 550 notifies the D2D server 560 that both the UE1 510-1 and the UE2 510-2 perform communication within the S-GW 540. The direct path candidate report message can include a bearer ID between the UE1 510-1 and the P-GW 540, an EPS bearer ID for the UE1 510-1, a bearer ID between the UE2 510-2 and the P-GW 540 and an EPS bearer ID for the UE2 510-2, or can include an IMSI of each of the UE1 510-1 and the UE2 510-2 as an identifier of the UE. The direct path candidate report message can include a dedicated D2D ID which is used only for direct path communication or another identifier of the UE which is known to both the MME 530 and the P-GW 550.

In step 507, the D2D server 560 transmits a location information request on the UE1 510-1 and the UE2 510-2 to the MME 530. In other words, the D2D server 560 asks the MME 530, which manages mobility of UEs, about current locations of the UE1 510-1 and the UE2 510-2.

In step 509, the MME 530 identifies the locations of the UE1 510-1 and the UE2 510-2, and transmits a location information response to the D2D server 560. In other words, the MME 530 identifies the serving eNB of the UE1 510-1 and the UE2 510-2 and informs the D2D server 560. Since the MME 530 manages mobility of UEs, the MME 530 can know that the UE1 510-1 and the UE2 510-2 belong to the eNB 520. In this case, the MME 530 can inform the D2D server 560 of an MME S1AP UE ID of the UE1 510-1 and the UE2 510-2.

In steps 505 to 509, the P-GW 550 transmits the direct path candidate report message to the D2D server 560, and the D2D server 560 asks the MME 530 about the location information. Accordingly, the MME 530 provides the location information to the D2D server 560. However, according to another exemplary embodiment of the present disclosure, the P-GW 550 can directly transmit the direct path candidate report message to the MME 530, and accordingly, the MME 530 can provide the location information to the D2D server 560 without asking separately.

In step 511, the D2D server 560 updates D2D pair candidate information based on the information provided by the MME 530. Specifically, as the D2D server 560 knows that the UE1 510-1 and the UE2 510-2 belong to the eNB 520, the D2D server 560 adds the UE1 510-1 and the UE2 510-2 as a D2D pair candidate. In other words, the D2D server 560 updates with the information indicating that the UE1 510-1 and the UE2 510-2 communicate with each other. In this case, in the D2D pair candidate information, the communication path between the UE1 510-1 and the UE2 510-2 is set as the default path.

In step 513, the D2D server 560 determines that the UE1 510-1 and the UE2 510-2 are able to communicate with each other via the direct path, and transmits a direct path measurement command message on the UE1 510-1 and the UE2 510-2 to the eNB 520. The direct path measurement command message can include at least one of an eNB S1AP UE ID, an MME S1AP UE ID, an EPS bearer ID, and an E-RAB ID of the UE1 510-1 and the UE2 510-2 in order for the eNB 520 and the MME 530 to identify the UE1 510-1 and the U2 510-2. In addition, the direct path measurement command message can include a dedicated D2D ID which is used only for the direct path communication or another identifier of the UE which is known to both the MME 530 and the P-GW 550.

In step 515, the eNB 520 transmits the direct path measurement command message to instruct to measure a channel state of the direct path to the UE1 510-1 and the UE2 510-2. The direct path measurement command message transmitted from the eNB 520 can include at least one of resource allocation information necessary for measuring the channel state, a resource allocation time, a reference signal code, a direct path measurement report message generating condition, and resource information to be used for transmitting the direct path measurement report message. For example, the direct path measurement report message generating condition includes a condition that at least one designated from among received power of a reference signal, an SIR, and an SINR exceeds a threshold value.

In step 517, the UE1 510-1 and the U2 510-2 each measure a channel state of the direct path with the other. To achieve this, the eNB 520 can allocate radio resources for measuring the channel. For example, the UE1 510-1 and the UE2 510-2 each can measure the channel state by using a signal of a pre-defined value transmitted from the other.

In step 519, the UE1 510-1 and the UE2 510-2 each transmit a direct path measurement report indicating the channel state of the direct path to the eNB 520. The direct path measurement report includes the direct path quality information which is measured in step 517. For example, the direct path quality information can include at least one of received power of a reference signal, an SIR, and an SINR. In addition, the direct path measurement report can include a reporting condition which is designated by the direct path measurement command received from the eNB 520. To achieve this, the eNB 520 can allocate radio resources for transmitting the result of the measuring.

In step 521, the eNB 520 determines to allow the UE1 510-1 and the UE2 510-2 to communicate with each other via the direct path. That is, the eNB 520 determines to switch to the direct path based on the channel state of the direct path reported by the UE1 510-1 and the UE2 510-2 and a current network condition (e.g., a cellular network capacity, the number of connected UEs, and an estimated throughput, etc.). For example, the eNB 520 can determine to switch to the direct path when the channel quality of the direct path exceeds a pre-defined threshold value.

In step 523, the eNB 520 transmits a direct path request to the MME 530 according to the determination to switch to the direct path. That is, the eNB 520 requests the MME 530 to switch to the direct path. The direct path request message can include at least one of an eNB S1AP UE ID, an MME S1AP UE ID, an EPS bearer ID, and an E-RAB ID in order for the eNB 520 and the MME 530 to identify the UE1 510-1 and the UE2 510-2. In addition, the direct path request message can include a dedicated D2D ID which is used only for the direct path communication or another identifier of the UI which is known to both the MME 530 and the P-GW 550. Furthermore, the direct path request message can further include information included in the direct path measurement report message, for example, received power of a reference signal, an SIR, an SINR, and a reporting condition which is designated by the direct path measurement command received from the eNB 520.

In step 525, the MME 530 transmits a direct path response to the eNB 520. The direct path response message can include at least one of an indicator which instructs to switch to the direct path, an MME S1AP UE ID, an EPS bearer ID, and an E-RAB ID of the UE1 510-1 and the UE2 510-2. In this case, according to another exemplary embodiment of the present disclosure, the MME 530 can determine whether to switch to the direct path based on the same information as in the eNB 520. In this case, when it is determined that it is not necessary to switch to the direct path, the MME 530 can transmit a direct path reject message rather than the direct path response.

In step 527, the eNB 520 transmits a direct path command message to the UE1 510-1 and the UE2 510-2. The direct path command message can include at least one of a D2D ID to be used in the direct path, a D2D ID of the other UE, a subframe offset informing a start point of the direct path communication, a D2D bearer ID for using the direct path, and a PDCP sequence number to be used.

In step 529, the UE1 510-1 and the UE2 510-2 set the direct path. For example, the UE1 510-1 and the UE2 510-2 can exchange a D2D security key with each other, set the D2D bearer ID and synchronization and a timing offset between the UEs 510, synchronize an RLC sequence number, and set initial values of other necessary parameters such as an MCS, etc.

In step 531, the UE1 510-1 and the UE2 510-2 transmit a direct path complete message to the D2D server 560 via the eNB 520. The direct path complete message can be transmitted to the MME 530 in the form of an NAS message which is directly communicated to the MME 530, and the MME 530 can transmit the direct path complete message to the D2D server 540. When the eNB 520 needs to know that the direct path is set, the UE1 510-1 and the UE2 510-2 transmit the direct path complete message to the eNB 520 in the form of an RRC message and then the eNB 520 transmits the direct path complete message to the MME 530 according to the S1-AP protocol. The direct path complete message can include at least one of an indicator informing that the direct path has been set, a D2D ID of at least one of the UE1 510-1 and the UE2 510-2, and an EPS bearer ID used in the default path.

In step 533, the UE1 510-1 and the UE2 510-2 communicate with each other via the direct path. In this case, since the default path is not used, the UE1 510-1 and the UE2 510-2 can transit to the RRC-idle state. When the UE1 510-1 and the UE2 510-2 transit to the idle state, unnecessary power consumption of the UE1 510-1 and the UE2 510-2 can be prevented.

In step 535, the D2D server 560 updates D2D candidate pair information. Specifically, the D2D server 560 updates with the information indicating that the UE1 510-1 and the UE2 510-2 communicate with each other via the direct path.

Figure 6:
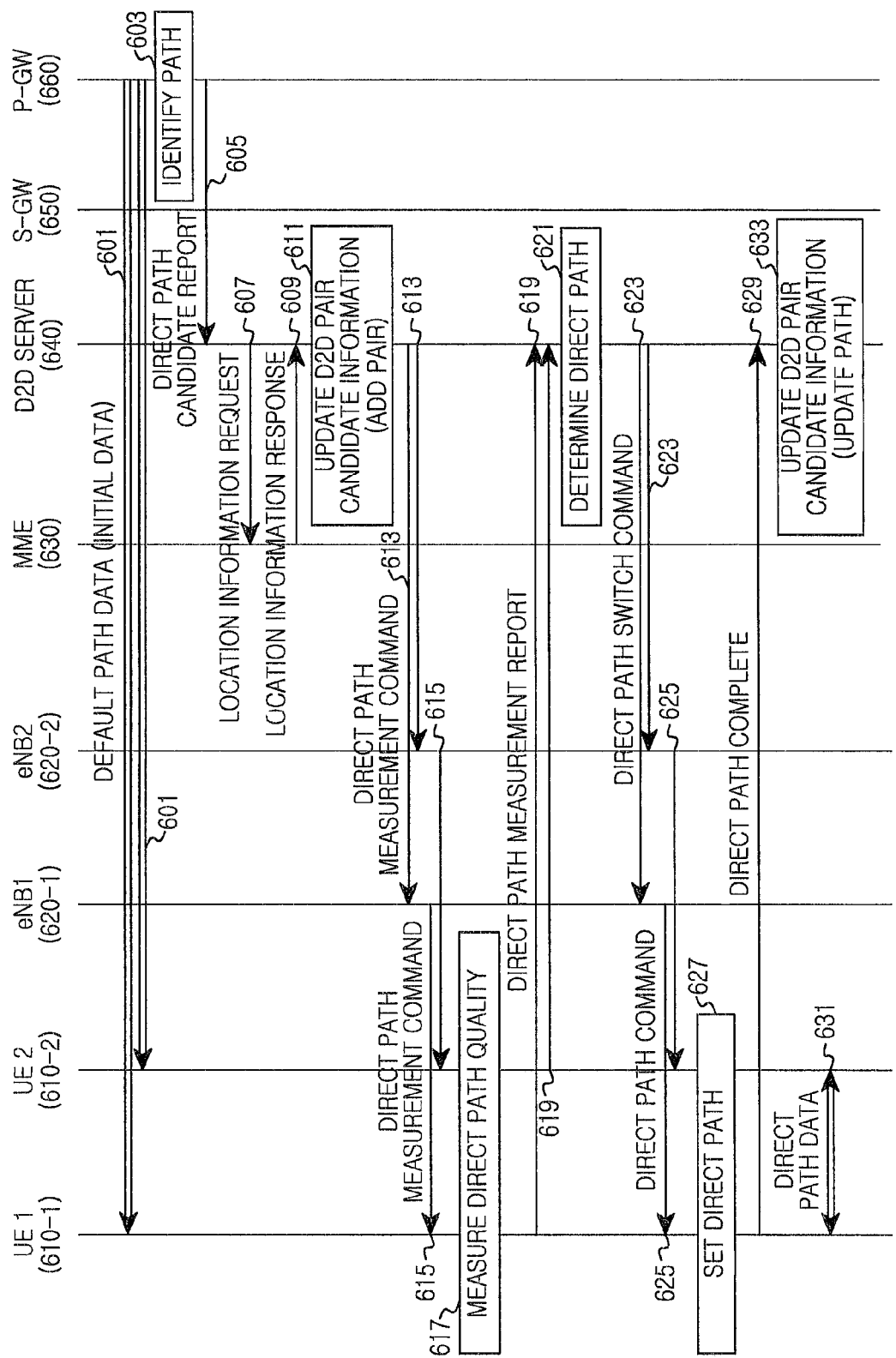
FIG. 6 illustrates a signaling for switching a communication path in a wireless communication system according to another exemplary embodiment of the present disclosure.

FIG. 6 illustrates signaling for switching a communication path in a wireless communication system according to another exemplary embodiment of the present disclosure. FIG. 6 illustrates a case in which UEs having different serving eNBs switch from a default path to a direct path, and illustrates an exemplary embodiment in which a D2D server is configured as a separate entity.

Referring to FIG. 6, in step 601, UE1 610-1 and UE2 610-2 communicate with each other via a default path passing through an eNB1 620-1, an eNB 620-2, an MME 630, an S-GW 640, and a P-GW 650. That is, the UE1 610-1 and the UE2 610-2 are in an RRC-connected state and exchange data with each other via the default path.

In step 603, the P-GW 650 identifies the communication path of the UE1 610-1 and the UE2 610-2. Since the P-GW 650 serves to forward packets of the UE1 610-1 and the UE2 610-2 to an external network, the P-GW 650 can know that the UE1 610-1 and the UE2 610-2 communicate with each other and belong to the S-GW 640. In this case, the P-GW 650 identifies that the packets exchanged between the UE1 610-1 and the UE2 610-2 are not transmitted to the external network.

In step 605, the P-GW 650 transmits a direct path candidate report message to the D2D server 660. That is, the P-GW 650 notifies the D2D server 660 equipped with D2D functions that the UE1 610-1 and the UE2 610-2 perform communication within the S-GW 440. The direct path candidate report message can include a bearer ID between the UE1 610-1 and the P-GW 640, an EPS bearer ID for the UE1 610-1, a bearer ID between the UE2 610-2 and the P-GW 640 and an EPS bearer ID for the UE2 610-2, or, can include an IMSI of each of the UE1 610-1 and the UE2 610-2 as an identifier of the UE. The direct path candidate report message can include a dedicated D2D ID which is used only for the direct path communication or another identifier of the UE which is known to both the MME 630 and the P-GW 650.

In step 607, the D2D server 660 transmits a location information request on the UE1 610-1 and the UE 610-2 to the MME 630. In other words, the D2D server 660 asks the MME 630, which manages mobility of UEs, about current locations of the UE1 610-1 and the UE2 610-2.

In step 609, the MME 630 identifies the locations of the UE1 610-1 and the UE2 610-2 and transmits a location information response to the D2D server 660. In other words, the MME 630 identifies the serving eNBs of the UE1 610-1 and the UE2 610-2 and informs the D2D server 660. Since the MME 630 manages mobility of UEs, the MME 630 can know that the UE1 610-1 and the UE2 610-2 belongs to the eNB2s 620.

In steps 605 to 609, the P-GW 650 transmits the direct path candidate report message to the D2D server 660 and the D2D server 660 asks the MME 630 about the location information. Accordingly, the MME 630 provides the location information to the D2D server 660. However, according to another exemplary embodiment of the present disclosure, the P-GW 650 can directly transmit the direct path candidate report message to the MME 630, and accordingly, the MME 630 can provide the location information to the D2D server 660 without asking separately.

In step 611, the D2D server 660 updates D2D pair candidate information based on the information provided by the MME 630. Specifically, as the D2D server 660 knows that the UE1 610-1 and the UE2 610-2 belong to their respective neighboring eNBs 620, the D2D server 660 adds the UE1 610-1 and the U2 610-2 as a D2D pair candidate. In other words, the D2D server 660 updates with the information indicating that the UE1 610-1 and the UE2 610-2 communicate with each other. In this case, in the D2D pair candidate information, the communication path between the UE1 610-1 and the UE2 610-2 is set as the default path.

In step 613, the D2D server 660 determines that the UE1 610-1 and the UE2 610-2 are able to communicate with each other via the direct path, and transmits a direct path measurement command message on the UE1 610-1 and the UE2 610-2 to the eNB1 620-1 and the eNB2 620-2. The direct path measurement command message can include at least one of an eNB S1AP UE ID, an MME S1AP UE ID, an EPS bearer ID, and an E-RAB ID of the UE1 610-1 and the UE2 610-2 in order for the eNB 620 and the MME 630 to identify the UE1 610-1 and the U2 610-2. In addition, the direct path measurement command message can include a dedicated D2D ID which is used only for the direct path communication or another identifier of the UE which is known to both the MME 630 and the P-GW 650.

In step 615, the eNB1 620-1 and the eNB2 620-2 transmit the direct path measurement command message to instruct to measure a channel state of the direct path to the UE1 610-1 and the UE2 610-2. The direct path measurement command message transmitted from the eNBs 620 can include at least one of resource allocation information necessary for measuring the channel state, a resource allocation time, a reference signal code, a direct path measurement report message generating condition, and resource information to be used for transmitting the direct path measurement report message. For example, the direct path measurement report message generating condition includes a condition that at least one designated from among received power of a reference signal, an SIR, and an SINR exceeds a threshold value.

In step 617, the UE1 610-1 and the U2 610-2 each measure a channel state of the direct path with the other. To achieve this, the eNB1 620-1 and the eNB2 620-2 can allocate radio resources for measuring the channel. For example, the UE1 610-1 and the UE2 610-2 each can measure the channel state by using a signal of a pre-defined value transmitted from the other.

In step 619, the UE1 610-1 and the UE2 610-2 each transmit a direct path measurement report indicating the channel state of the direct path to the D2D server 660 via the eNB1 620-1 and the eNB2 620-2. The direct path measurement report includes the direct path quality information which is measured in step 617. For example, the direct path quality information can include at least one of received power of a reference signal, an SIR, and an SINR. In addition, the direct path measurement report can include a reporting condition which is designated by the direct path measurement command received from the eNBs 620. To achieve this, the eNB1 620-1 and the eNB2 620-2 can allocate radio resources for transmitting the result of the measuring. This is because the D2D server 660 determines whether to switch to the direct path since the serving eNBs of the UE1 610-1 and the UE2 610-2 are different unlike in the exemplary embodiment of FIG. 5.

In step 621, the D2D server 660 determines to switch to the direct path. That is, the D2D server 660 determines to switch to the direct path based on the channel state of the direct path reported by the UE1 610-1 and the UE2 610-2 and a current network condition (e.g., a cellular network capacity, the number of connected UEs, and an estimated throughput, etc.). For example, the D2D server 660 can determine to switch to the direct path when the channel quality of the direct path exceeds a pre-defined threshold value.

In step 623, the D2D server 660 transmits a direct path switch command to each of the eNB1 620-1 and the eNB2 620-2. The direct path switch command message includes an indicator which instructs to switch to the direct path. In addition, the direct path switch command message can include at least one of an eNB S1AP UE IE, an MME S1AP UE ID, an EPS bearer ID, and an E-RAB ID of the UE1 610-1 and the UE2 610-2 in order for the eNBs 620 and the MME 630 to identify the UE1 610-1 and the UE2 610-2.

In step 625, the eNB1 620-1 and the eNB2 620-2 transmit a direct path command message to the UE1 610-1 and the U2 610-2. The direct path command message can include at least one of a D2D ID to be used in the direct path, a D2D ID of the other UE, a subframe offset informing a start point of the direct path communication, a D2D bearer ID for using the direct path, and a PDCP sequence number to be used.

In step 627, the UE1 610-1 and the UE2 610-2 set the direct path. For example, the UE1 610-1 and the UE2 610-2 can exchange a D2D security key with each other, set the D2D bearer ID and synchronization and a timing offset between the UEs 610, synchronize an RLC sequence number, and set initial values of other necessary parameters such as an MCS, etc.

In step 629, the UE1 610-1 and the UE2 610-2 transmit a direct path complete message to the D2D server 660 via the eNB1 620-1 and the eNB2 620-2. The direct path complete message can be transmitted to the MME 630 in the form of an NAS message which is directly communicated to the MME 630, and the MME 630 can transmit the direct path complete message to the D2D server 640. When the eNBs 620 needs to know that the direct path is set, the UE1 610-1 and the UE2 610-2 transmit the direct path complete message to the eNBs 620 in the form of an RRC message, the eNBs 620 transmit the direct path complete message to the MME 630 according to the S1-AP protocol, and then the MME 630 transmits the direct path complete message to the D2D server 640. The direct path complete message can include at least one of an indicator informing that the direct path has been set, a D2D ID of at least one of the UE1 610-1 and the UE2 610-2, and an EPS bearer ID used in the default path.

In step 631, the UE1 610-1 and the UE2 610-2 communicate with each other via the direct path. In this case, since the default path is not used, the UE1 610-1 and the UE2 610-2 can transit to the RRC-idle state. When the UE1 610-1 and the UE2 610-2 transit to the idle state, unnecessary power consumption of the UE1 610-1 and the UE2 610-2 can be prevented.

In step 633, the D2D server 660 updates D2D candidate pair information. Specifically, the D2D server 660 updates with the information indicating that the UE1 610-1 and the UE2 610-2 communicate with each other via the direct path.

Figure 7:
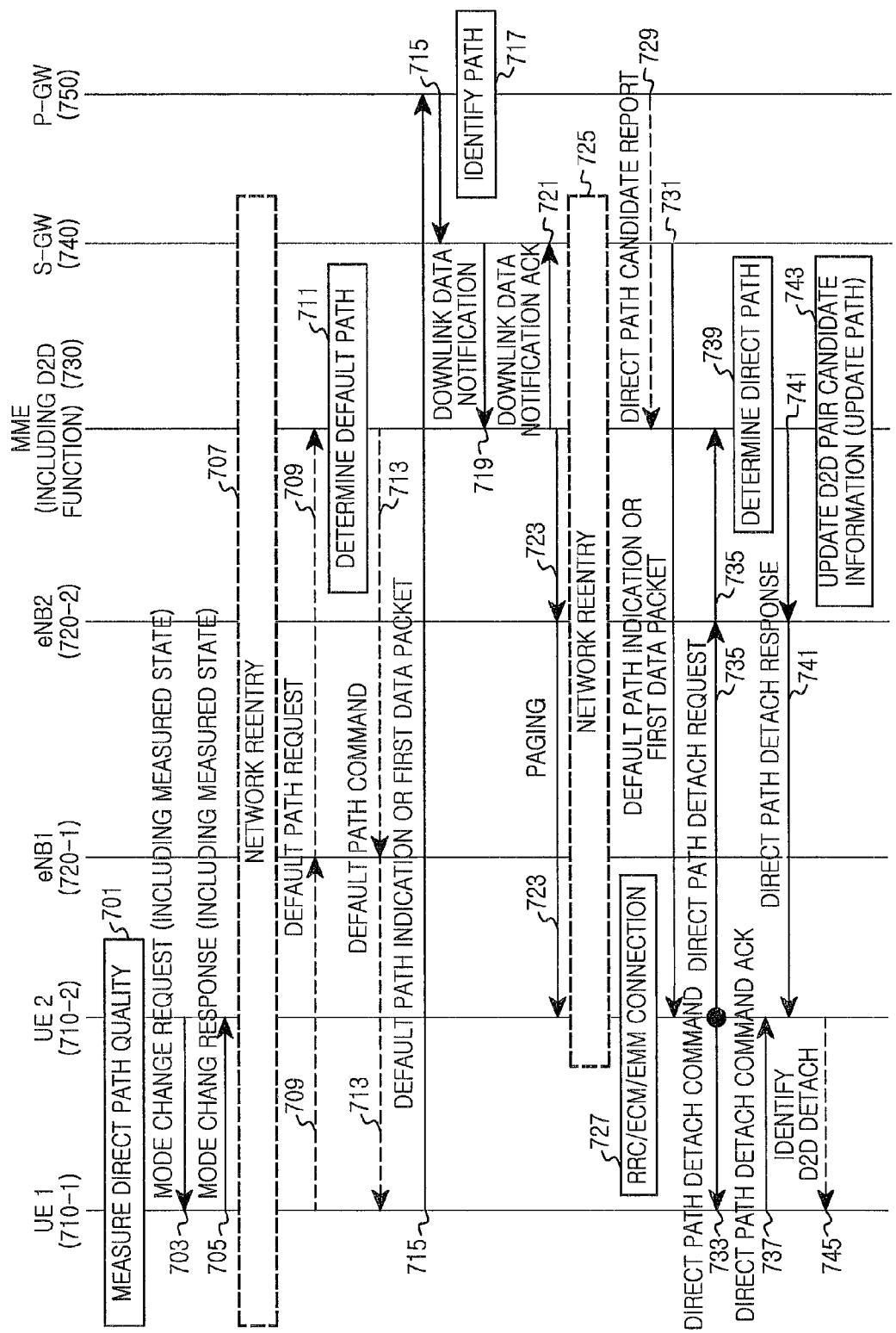
FIG. 7 illustrates a signaling for switching a communication path in a wireless communication system according to another exemplary embodiment of the present disclosure.

FIG. 7 illustrates signaling for switching a communication path in a wireless communication system according to another exemplary embodiment of the present disclosure. FIG. 7 illustrates a case in which UEs having different serving eNBs switch from a direct path to a default path, and illustrates an exemplary embodiment in which functions of a D2D server are included in an MME.

Referring to FIG. 7, in step 701, at least one of UE1 710-1 and UE2 710-2 measures a channel state of the direct path with the other in the process of communicating with each other via the direct path. For example, the UE1 710-1 and the UE2 710-2 each can measure the channel state by using a signal of a pre-defined value transmitted from the other.

In step 703, when the UE1 710-1 determines to switch to the default path for some reason such as deterioration in the channel of the direct path, the UE1 710-1 transmits a mode change request message to the other UE that the UE1 710-1 communicates with via the direct path, that is, the UE2 710-2. The mode change request message includes a channel condition measured by the UE1 710-1, cellular connection information, etc., and is to request to switch to the default path.

In step 705, when the UE2 710-2 determines to switch to the default path, the UE2 710-2 transmits a mode change response message. The mode change response message includes a channel condition measured by the UE2 710-2, cellular connection information, etc., and is to approve the switch to the default path.

In step 707, the UE1 710-1 performs a network reentry procedure to switch to the default path. The network reentry procedure is a procedure for transitioning from an RRC-idle state to an RRC-connected state and is performed through pre-defined signaling. However, when the UE1 710-1 has never entered the RRC-idle state during the direct path communication, step 707 can be omitted.

In step 709, the UE1 710-1 which enters the RRC-connected state transmits a default path request message to request to switch to the default path to an MME 730 via an eNB1 720-1. In this case, according to an exemplary embodiment of the present disclosure, the default path request message can include the result of the measuring the channel quality of the UE1 710-1. According to another exemplary embodiment of the present disclosure, the default path request message may not include the result of the measuring the channel quality provided by the UE1 710-1 and can request only to switch to the default path. In this case, the UE1 710-1 can directly determine whether to switch to the default path.

In step 711, the MME 730 determines to switch the path between the UE1 710-1 and the UE2 710-2 to the default path based on the default path request message. However, according to another exemplary embodiment of the present disclosure, step 711 can be omitted. For example, this is because the MME 730 can accept the determination of the UEs 710 on whether to switch the path.

In step 713, the MME 730 transmits a default path command message to approve the switch to the default path to the UE1 710-1 via the eNB1 720-1. The default path command message can include at least one of a D2D bearer ID of the direct path, a D2D ID of the direct path used for the direct path communication by the UE1 710-1 and the UE2 710-2, and an EPS bearer ID, an E-RAB ID, or a Service Architecture Evolution-SAE-Temporary Mobile Subscriber Identity (S-TMSI) of a terminal.

In step 715, the UE1 710-1 transmits a default path indication message to a P-GW 750 via the eNB1 720-1, and the P-GW 750 forwards the default path indication message to an S-GW 740. The default path indication message is encapsulated in a data packet, so that the eNBs 720, the S-GW 740, and the P-GW 750 treat the default path indication message as a data packet. According to another exemplary embodiment of the present disclosure, the UE1 710-1 can transmit the data packet instead of the default path indication. The data packet is a packet which designates the UE2 710-2 as a destination and can include data which is defined to switch the path or can include certain data.

In step 717, the P-GW 750 identifies the path. That is, the P-GW 750 identifies a receiver of the default path indication message or the data packet, and identifies the path to the receiver.

In step 719, the S-GW 740 transmits a downlink data notification to the MME 730. In other words, the S-GW 740 notifies the MME 730 of existence of downlink data to be transmitted to the UE2 710-2.

In step 721, the MME 730 transmits a downlink data notification acknowledgement (ACK) to the S-GW 740.

In step 723, the MME 730 transmits a paging message to the UE2 710-2. That is, the MME 730 informs the UE2 710-2 of the existence of the downlink data.

In step 725, when the UE2 710-2 is in the RRC-idle state, the UE2 710-2 performs a network reentry procedure. The network reentry procedure is a procedure for transitioning from the RRC-idle state to the RRC-connected state and is performed through pre-defined signaling. However, when the UE2 710-2 has never entered the RRC-idle state during the direct path communication, step 725 can be omitted.

In step 727, the UE2 710-2 enters an RRC/Evolved packet system Connection Management (ECM)/Evolved packet system Mobility Management (EMM) connection state.

In step 729, the P-GW 750 transmits a direct path candidate report to the MME 730. However, according to another exemplary embodiment of the present disclosure, step 729 can be omitted. The direct path candidate report message can include a bearer ID or an EPS bearer ID between the UE1 710-1 and the P-GW 740, and a bearer ID or an EPS bearer ID between the UE2 710-2 and the P-GW 740, or can include an IMSI of each of the UE1 710-1 and the UE2 710-2 as an identifier of the UE. The direct path candidate report message can use a dedicated D2D ID which is used only for the direct path communication or another identifier of the UE which is known to both the MME 730 and the P-GW 750.

In step 731, the S-GW 740 transmits the default path indication message or the data packet to the UE2 710-2 via an eNB2 720-2.

In step 733, the UE2 710-2 transmits a direct path detach command message to the UE1 710-1. In other words, the UE2 710-2 notifies the UE1 710-1 that the direct path will be detached and communication will be performed via the default path.

In step 735, the UE2 710-2 transmits a direct path detach request message to the MME 730 via the eNB2 720-2. In other words, the UE2 710-2 requests the MME 730 to end the direct path communication and switch to the default path. The direct path detach request message can include at least one of an MME S1AP UE ID, an EPS bearer ID, and an E-RAB ID as identification information of the UE2 710-2.

In step 737, the UE1 710-1 transmits a direct path detach command ACK to the UE2 720-2. Accordingly, the UE2 720-2 determines that the direct path detach command message has been transmitted to the UE1 710-1.

In step 739, the MME 730 determines to switch the path between the UE1 710-1 and the UE2 710-2 to the default path based on the direct path detach request message. Alternatively, the switch to the default path can be rejected for some reason such as a problem in a cellular network. In this case, the direct path detach response may not be transmitted or a direct path detach rejection message can be transmitted to explicitly inform the rejection. In this case, the UE1 710-1 and the UE2 710-2 continue to communicate with each other via the direct path. Thereafter, the UE1 710-1 and the UE2 710-2 can request to switch to the default path again according to an exemplary embodiment.

In step 741, the MME 730 transmits a direct path detach response message to the UE2 710-2. That is, the MME 730 notifies the UE2 710-2 that the switch to the default path has been approved.

In step 743, the MME 730 updates D2D pair candidate information. Specifically, the MME 730 updates the path between the UE1 710-1 and the UE2 710-2 with the default path. Furthermore, according to another exemplary embodiment of the present disclosure, the MME 730 can delete the pair of the UE1 710-1 and the UE2 710-2 from the D2D pair candidate information. For example, the MME 730 can determine whether to delete the pair of the UE1 710-1 and the UE2 710-2 based on a channel quality of the direct path between the UE1 710-1 and the UE2 710-2, or a network condition (e.g., a cellular network capacity, the number of connected UEs, an estimated throughput, etc.).

In step 745, the UE2 710-2 transmits a D2D detach confirm message to the UE1 710-1. Accordingly, the direct path is detached and the path between the UE1 710-1 and the UE2 710-2 switches to the direct path. In this case, the UE1 710-1 and the UE2 710-2 can transit a D2D communication module to an idle state to save power.

In the exemplary embodiment illustrated in FIG. 7, the UE1 710-1 requests the MME 730 to switch to the default path, and accordingly, the MME 730 controls the UE2 710-2 to reenter the network through the paging procedure. However, according to another exemplary embodiment of the present disclosure, the paging procedure can be omitted. That is, since the UE2 710-2 as well as the UE1 710-1 recognizes that it is necessary to switch to the default path through steps 701 to 705, both the UE1 710-1 and the UE2 710-2 can request the MME 730 to switch to the default path. In this case, the UE1 710-1 and the UE2 710-2 can switch to the default path without going through the paging procedure. Another exemplary embodiment in which the paging procedure is omitted will be explained below with reference to FIG. 8.

Figure 8:
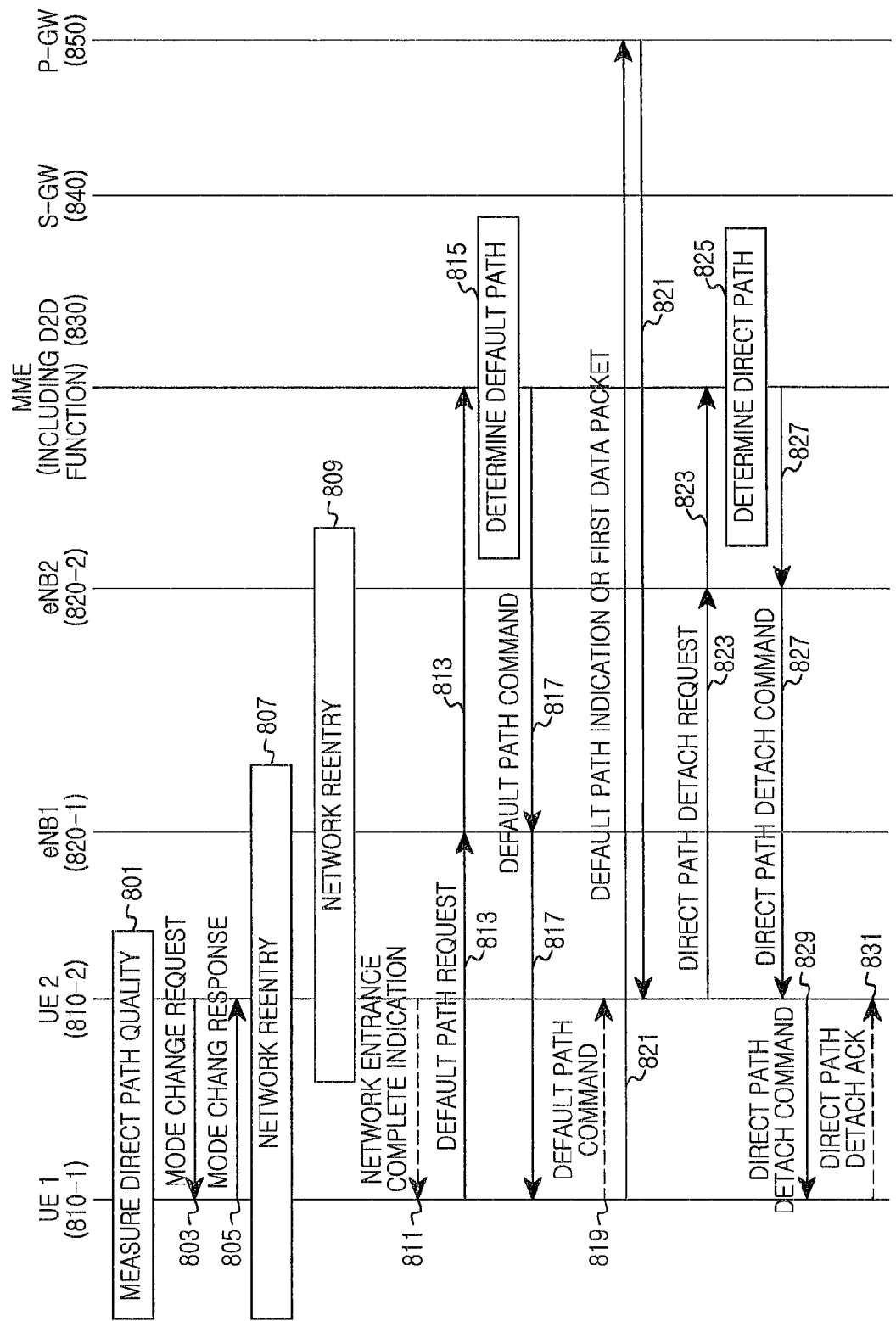
FIG. 8 illustrates a signaling for switching a communication path in a wireless communication system according to another exemplary embodiment of the present disclosure.

FIG. 8 illustrates signaling for switching a communication path in a wireless communication system according to another exemplary embodiment of the present disclosure. FIG. 8 illustrates a case in which UEs having different serving eNBs switch from a direct path to a default path, and illustrates an exemplary embodiment in which functions of a D2D server are included in an MME.

Referring to FIG. 8, in step 801, at least one of UE1 810-1 and UE2 810-2 measures a channel state of the direct path with the other in the process of communicating with each other via the direct path. For example, the UE1 810-1 and the UE2 810-2 each can measure the channel state by using a signal of a pre-defined value transmitted from the other.

In step 803, when the UE1 810-1 determines to switch to the default path for some reason such as deterioration in the channel of the direct path, the UE1 810-1 transmits a mode change request message to the other UE that the UE1 810-1 communicates with via the direct path, that is, the UE2 810-2. The mode change request message includes a channel condition measured by the UE1 810-1, cellular connection information, etc., and is to request to switch to the default path.

In step 805, when the UE2 810-2 determines to switch to the default path, the UE2 810-2 transmits a mode change response message. The mode change response message includes a channel condition measured by the UE2 810-2, cellular connection information, etc., and is to approve the switch to the default path.

In step 807, the UE1 810-1 performs a network reentry procedure to switch to the default path. The network reentry procedure is a procedure for transitioning from an RRC-idle state to an RRC-connected state and is performed through pre-defined signaling. However, when the UE1 810-1 has never entered the RRC-idle state during the direct path communication, step 807 can be omitted.

In step 809, the UE2 810-2 performs a network reentry procedure to switch to the default path. The network reentry procedure is a procedure for transitioning from an RRC-idle state to an RRC-connected state and is performed through pre-defined signaling. However, when the UE2 810-2 has never entered the RRC-idle state during the direct path communication, step 809 can be omitted.

In step 811, the UE2 810-2 transmits a network entry complete indication to the UE1 810-1. In other words, the UE2 810-2 notifies the UE1 810-1 that the UE2 810-2 has entered the network.

In step 813, the UE1 810-1 transmits a default path request message to request to switch to the default path to an MME 830 via an eNB1 820-1. In this case, according to an exemplary embodiment of the present disclosure, the default path request message can include the result of the measuring the channel quality of the UE1 810-1. According to another exemplary embodiment of the present disclosure, the default path request message may not include the result of the measuring the channel quality provided by the UE1 810-1 and can request only to switch to the default path. In this case, the UE1 810-1 can directly determine whether to switch to the default path.

In step 815, the MME 830 determines to switch the path between the UE1 810-1 and the UE2 810-2 to the default path based on the default path request message. However, according to another exemplary embodiment of the present disclosure, step 815 can be omitted. For example, this is because the MME 830 can accept the determination of the UEs 810 on whether to switch the path.

In step 817, the MME 830 transmits a default path command message to approve the switch to the default path to the UE1 810-1 via the eNB1 820-1. The default path command message can include at least one of a D2D bearer ID or a D2D ID of the direct path used for the direct path communication by the UE1 810-1 and the UE2 810-2, or an EPS bearer ID, an E-RAB ID, or a Service Architecture Evolution-SAE-Temporary Mobile Subscriber Identity (S-TMSI) of a terminal.

In step 819, the UE1 810-1 transmits the default path command message to approve the switch to the default path to the UE2 810-2. Accordingly, the UE2 810-2 identifies that the switch to the default path has been approved.

In step 821, the UE1 810-1 transmits a default path indication message to a P-GW 850 via the eNB1 820-1, and the P-GW 850 forwards the default path indication message to the UE2 810-2. The default path indication message is encapsulated in a data packet, so that the eNBs 820, the S-GW 840, and the P-GW 850 treat the default path indication message as a data packet. According to another exemplary embodiment of the present disclosure, the UE1 810-1 can transmit the data packet instead of the default path indication. The data packet is a packet which designates the UE2 810-2 as a destination and can include data which is defined to switch the path or can include certain data.

In step 823, the UE2 810-2 transmits a direct path detach request message to the MME 830 via the eNB2 820-2. In other words, the UE2 810-2 requests the MME 830 to end the direct path communication and switch to the default path. The direct path detach request message can include at least one of an MME S1AP UE ID, an EPS bearer ID, and an E-RAB ID as identification information of the UE2 810-2.

In step 825, the MME 830 determines to switch the path between the UE1 810-1 and the UE2 810-2 to the default path based on the direct path detach request message. Alternatively, the switch to the default path can be rejected for some reason such as a problem in a cellular network. In this case, the direct path detach response may not be transmitted or a direct path detach rejection message can be transmitted to explicitly inform the rejection. In this case, the UE1 810-1 and the UE2 810-2 continue to communicate with each other via the direct path. Thereafter, the UE1 810-1 and the UE2 810-2 can request to switch to the default path again according to an exemplary embodiment.

In step 827, the MME 830 transmits a direct path detach command message to the UE2 810-2. That is, the MME 830 notifies the UE2 810-2 that the switch to the default path has been approved.

In step 829, the UE2 810-2 transmits the direct path detach command message to the UE1 810-1. Accordingly, the UE1 810-1 identifies that the direct path is instructed to be detached. In step 831, the UE1 810-1 transmits a direct path detach ACK to the UE2 810-2.

Figure 9:
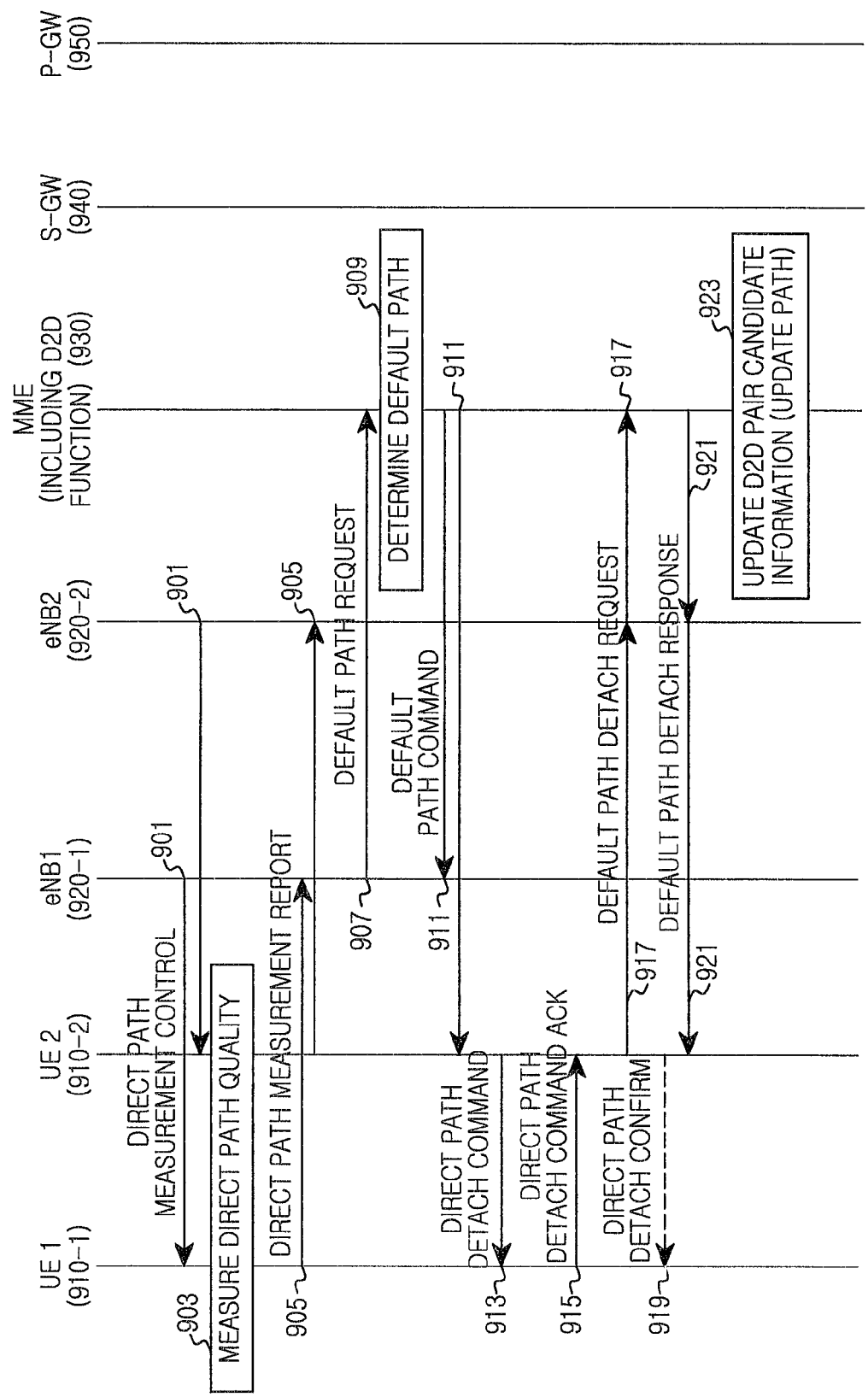
FIG. 9 illustrates a signaling for switching a communication path in a wireless communication system according to another exemplary embodiment of the present disclosure.

FIG. 9 illustrates signaling for switching a communication path in a wireless communication system according to another exemplary embodiment of the present disclosure. FIG. 9 illustrates a case in which UEs having different serving eNBs switch from a direct path to a default path, and illustrates an exemplary embodiment in which functions of a D2D server are included in an MME.

Referring to FIG. 9, in step 901, an eNB1 920-1 and an eNB2 920-2 transmit a direct path measurement control message to instruct to measure a channel state of the direct path to UE1 910-1 and UE2 910-2, respectively. The direct path measurement control message can include at least one of resource allocation information necessary for measuring the channel state, a resource allocation time, a reference signal code, a direct path measurement report message generating condition, and resource information to be used for transmitting a direct path measurement report message. For example, the direct path measurement report message generating condition includes a condition that at least one designated from among received power of a reference signal, an SIR, and an SINR exceeds a threshold value.

In step 903, the UE1 910-1 and the UE2 910-2 each measure a channel state of the direct path with the other. To achieve this, the eNB1 920-1 and the eNB2 920-2 can allocate radio resources for measuring the channel. For example, the UE1 910-1 and the UE2 910-2 each can measure the channel state by using a signal of a pre-defined value transmitted from the other.

In step 905, the UE1 910-1 and the UE2 910-2 each transmit a direct path measurement report indicating the channel state of the direct path to the eNB1 920-1 and the eNB2 920-2, respectively. The direct path measurement report includes measured direct path quality information. For example, the direct path quality information can include at least one of received power of a reference signal, an SIR, and an SINR. In addition, the direct path measurement report can include a reporting condition which is designated by the direct path measurement control message. To achieve this, the eNB1 920-1 and the eNB2 920-2 can allocate radio resources for transmitting the result of the measuring. This is because the eNB1 920-1 and the eNB2 920-2 control the measuring procedure unlike in the exemplary embodiment illustrated in FIG. 7.

In step 907, the eNB1 920-1 transmits a default path request message to request to switch to the default path to an MME 930. In this case, according to an exemplary embodiment of the present disclosure, the default path request message can include the result of the measuring the channel quality provided by the UE1 910-1. According to another exemplary embodiment of the present disclosure, the default path request message may not include the result of the measuring the channel quality provided by the UE1 910-1 and can request only to switch to the default path. In this case, the eNB1 920-1 can directly determine whether to switch to the default path.

In step 909, the MME 930 determines to switch the path between the UE1 910-1 and the UE2 910-2 to the default path based on the default path request message. Alternatively, the switch to the default path can be rejected for some reason such as a problem in a cellular network. In this case, a direct path detach response may not be transmitted or a direct path detach rejection message can be transmitted to explicitly inform the rejection. In this case, the UE1 910-1 and the UE2 910-2 continue to communicate with each other via the direct path. Thereafter, the UE1 910-1 and the UE2 910-2 can request to switch to the default path again according to an exemplary embodiment.

In step 911, the MME 930 transmits a default path command message to approve the switch to the default path to the eNB1 920-1 and the eNB2 920-2. The default path command message can include at least one of a D2D bearer ID or a D2D ID of the direct path used for the direct path communication by the UE1 910-1 and the UE2 910-2, or an EPS bearer ID, an E-RAB ID, or an S-TMSI of a terminal. The eNB2 920-2 transmits the default path command message to the UE2 910-2.

In step 913, the UE2 910-2 transmits a direct path detach command message to the UE1 910-1. In other words, the UE2 910-2 notifies the UE1 910-1 that the direct path will be detached and communication will be performed via the default path.

In step 915, the UE1 910-1 transmits a direct path detach command ACK to the UE2 920-2. Accordingly, the UE2 920-2 determines that the direct path detach command message has been transmitted to the UE1 910-1.

In step 917, the UE2 910-2 transmits a direct path detach request message to the MME 930 via the eNB2 920-2. In other words, the UE2 910-2 requests the MME 730 to end the direct path communication and switch to the default path. The direct path detach request message can include at least one of an MME S1AP UE ID, an EPS bearer ID, and an E-RAB ID as identification information of the UE2 910-2.

In step 919, the UE2 910-2 transmits a direct path detach confirm message to the UE1 910-1. Accordingly, the direct path is detached and the path between the UE1 910-1 and the UE2 910-2 switches to the default path. In this case, the UE1 910-1 and the UE2 910-2 can transit a D2D communication module to an idle state to save power.

In step 921, the MME 930 transmits a direct path detach response message to the UE2 910-2. That is, the MME 930 notifies the UE2 910-2 that the switch to the default path has been approved.

In step 923, the MME 930 updates D2D pair candidate information. Specifically, the MME 930 updates the path between the UE1 910-1 and the UE2 910-2 with the default path. Furthermore, according to another exemplary embodiment of the present disclosure, the MME 930 can delete the pair of the UE1 910-1 and the UE2 910-2 from the D2D pair candidate information. For example, the MME 930 can determine whether to delete the pair of the UE1 910-1 and the UE2 910-2 based on the channel quality of the direct path between the UE1 910-1 and the UE2 910-2, or a network condition (e.g., a cellular network capacity, the number of connected UEs, an estimated throughput, etc.).

Figure 10:
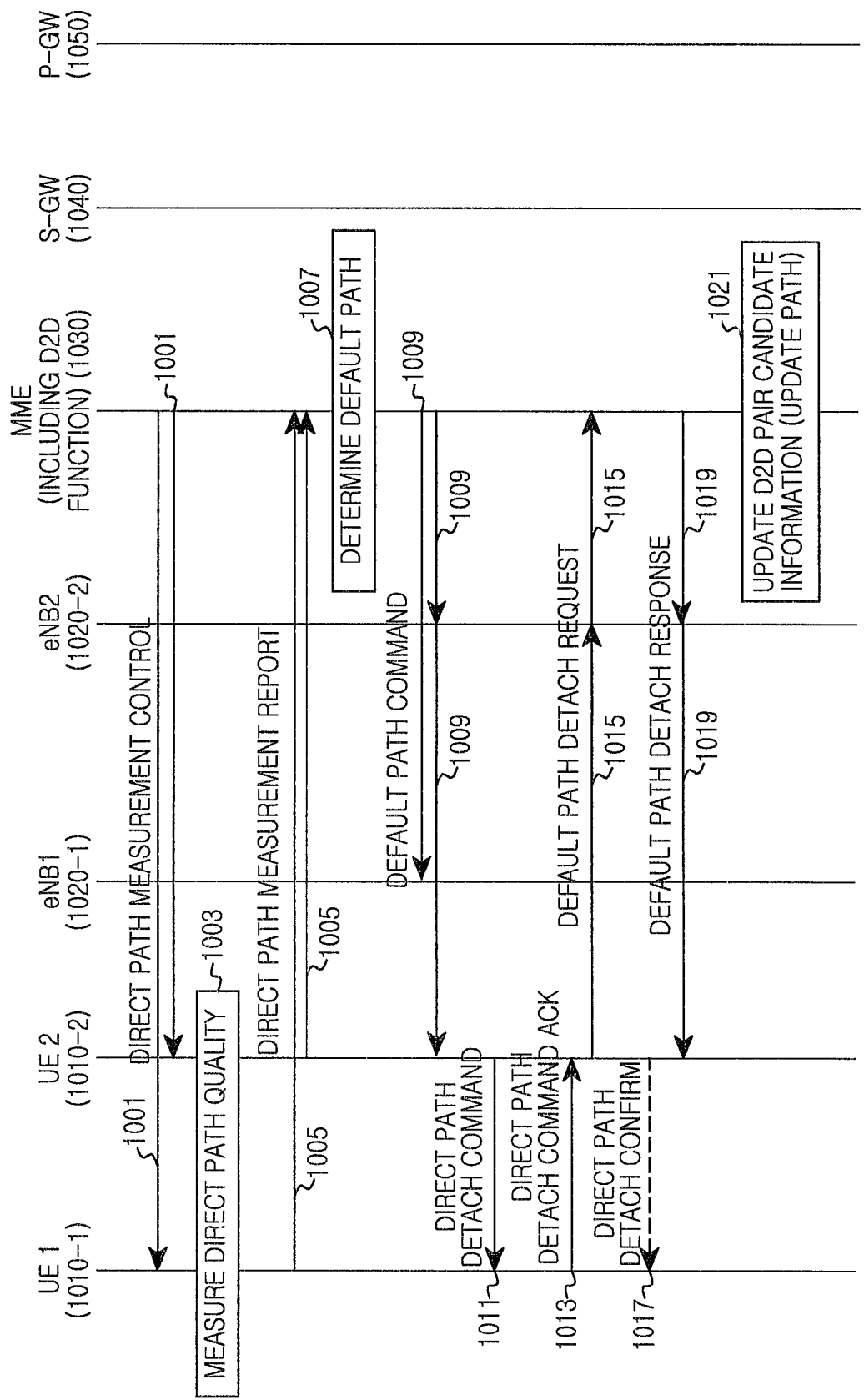
FIG. 10 illustrates a signaling for switching a communication path in a wireless communication system according to another exemplary embodiment of the present disclosure.

FIG. 10 illustrates signaling for switching a communication path in a wireless communication system according to another exemplary embodiment of the present disclosure. FIG. 10 illustrates a case in which UEs having different serving eNBs switch from a direct path to a default path, and illustrates an exemplary embodiment in which functions of a D2D server are included in an MME.

Referring to FIG. 10, in step 1001, an MME 1030 transmits a direct path measurement control message to instruct to measure a channel state of the direct path to UE1 1010-1 and UE2 1010-2. The direct path measurement control message can include at least one of resource allocation information necessary for measuring the channel state, a resource allocation time, a reference signal code, a direct path measurement report message generating condition, and resource information to be used for transmitting a direct path measurement report message. For example, the direct path measurement report message generating condition includes a condition that at least one designated from among received power of a reference signal, an SIR, and an SINR exceeds a threshold value.

In step 1003, the UE1 1010-1 and the UE2 1010-2 each measure a channel state of the direct path with the other. To achieve this, an eNB1 1020-1 and an eNB2 1020-2 can allocate radio resources for measuring the channel. For example, the UE1 1010-1 and the UE2 1010-2 each can measure the channel state by using a signal of a pre-defined value transmitted from the other.

In step 1005, the UE1 1010-1 and the UE2 1010-2 each transmit a direct path measurement report indicating the channel state of the direct path to the MME 1030. The direct path measurement report includes measured direct path quality information. For example, the direct path quality information can include at least one of received power of a reference signal, an SIR, and an SINR. In addition, the direct path measurement report can include a reporting condition which is designated by the direct path measurement control message. To achieve this, the eNB1 1020-1 and the eNB2 1020-2 can allocate radio resources for transmitting the result of the measuring. This is because the MME 1030 controls the measuring procedure unlike in the exemplary embodiment illustrated in FIG. 8.

In step 1007, the MME 1030 determines to switch the path between the UE1 1010-1 and the UE2 1010-2 to the default path based on the direct path measurement report.

In step 1009, the MME 1030 transmits a default path command message to approve the switch to the default path to the eNB1 1020-1 and the eNB2 1020-2. The default path command message can include at least one of a D2D bearer ID or a D2D ID of the direct path used for the direct path communication by the UE1 1010-1 and the UE2 1010-2, or an EPS bearer ID, an E-RAB ID, or an S-TMSI of a terminal. The eNB2 1020-2 transmits the default path command message to the UE2 1010-2.

In step 1011, the UE2 1010-2 transmits a direct path detach command message to the UE1 1010-1. In other words, the UE2 1010-2 notifies the UE1 1010-1 that the direct path will be detached and communication will be performed via the default path.

In step 1013, the UE1 1010-1 transmits a direct path detach command ACK to the UE2 1020-2. Accordingly, the UE2 1020-2 determines that the direct path detach command message has been transmitted to the UE1 1010-1.

In step 1015, the UE2 1010-2 transmits a direct path detach request message to the MME 1030 via the eNB2 1020-2. In other words, the UE2 1010-2 requests the MME 1030 to end the direct path communication and switch to the default path. The direct path detach request message can include at least one of an MME S1AP UE ID, an EPS bearer ID, and an E-RAB ID as identification information of the UE2 1010-2.

In step 1017, the UE2 1010-2 transmits a direct path detach confirm message to the UE1 1010-1. Accordingly, the direct path is detached and the path between the UE1 1010-1 and the UE2 1010-2 switches to the default path. In this case, the UE1 1010-1 and the UE2 1010-2 can transit a D2D communication module to an idle state to save power.

In step 1019, the MME 1030 transmits a direct path detach response message to the UE2 1010-2. That is, the MME 1030 notifies the UE2 1010-2 that the switch to the default path has been approved.

In step 1021, the MME 1030 updates D2D pair candidate information. Specifically, the MME 1030 updates the path between the UE1 1010-1 and the UE2 1010-2 with the default path. Furthermore, according to another exemplary embodiment of the present disclosure, the MME 1030 can delete the pair of the UE1 1010-1 and the UE2 1010-2 from the D2D pair candidate information. For example, the MME 1030 can determine whether to delete the pair of the UE1 1010-1 and the UE2 1010-2 based on the channel quality of the direct path between the UE1 1010-1 and the UE2 1010-2, or a network condition (e.g., a cellular network capacity, the number of connected UEs, an estimated throughput, etc.).

Figure 11:
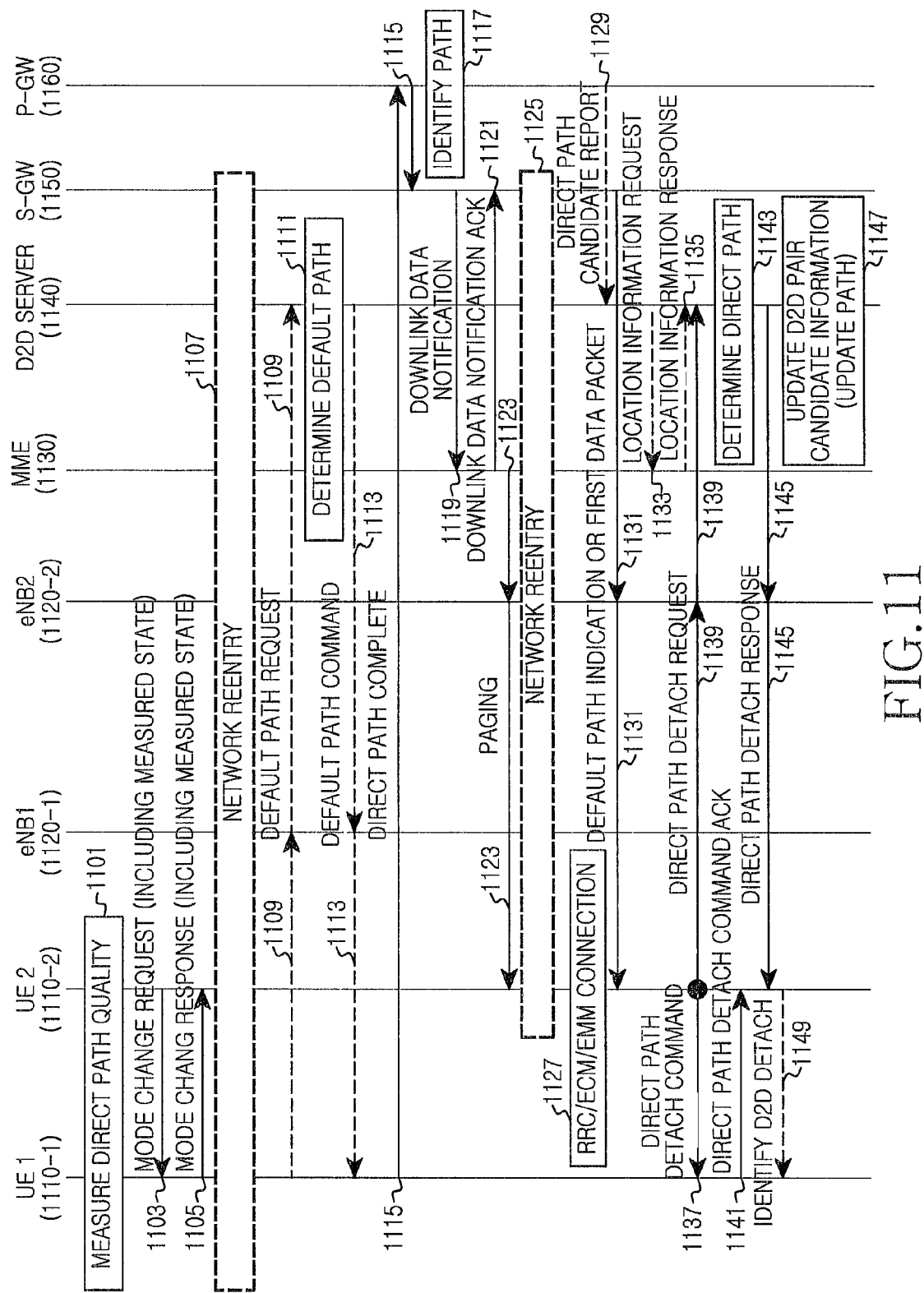
FIG. 11 illustrates a signaling for switching a communication path in a wireless communication system according to another exemplary embodiment of the present disclosure.

FIG. 11 illustrates signaling for switching a communication path in a wireless communication system according to another exemplary embodiment of the present disclosure. FIG. 11 illustrates a case in which UEs having different serving eNBs switch from a direct path to a default path, and illustrates an exemplary embodiment in which a D2D server is configured as a separate entity.

Referring to FIG. 11, in step 1101, at least one of UE1 1110-1 and UE2 1110-2 measures a channel state of the direct path with the other in the process of communicating with each other via the direct patH. For example, the UE1 1110-1 and the UE2 1110-2 each can measure the channel state by using a signal of a pre-defined value transmitted from the other.

In step 1103, when the UE1 1110-1 determines to switch to the default path for some reason such as deterioration in the channel of the direct path, the UE1 1110-1 transmits a mode change request message to the other UE that the UE1 1110-1 communicates with via the direct path, that is, the UE2 1110-2. The mode change request message includes a channel condition measured by the UE1 1110-1, cellular connection information, etc., and is to request to switch to the default path.

In step 1105, when the UE2 1110-2 determines to switch to the default path, the UE2 1110-2 transmits a mode change response message. The mode change response message includes a channel condition measured by the UE2 1110-2, cellular connection information, etc., and is to approve the switch to the default path.

In step 1107, the UE1 1110-1 performs a network reentry procedure to switch to the default path. The network reentry procedure is a procedure for transitioning from an RRC-idle state to an RRC-connected state and is performed through pre-defined signaling. However, when the UE1 1110-1 has never entered the RRC-idle state during the direct path communication, step 1107 can be omitted.

In step 1109, the UE1 1110-1 which enters the RRC-connected state transmits a default path request message to request to switch to the default path to a D2D server 1160 via an eNB1 1120-1. In this case, according to an exemplary embodiment of the present disclosure, the default path request message can include the result of the measuring the channel quality of the UE1 1110-1. According to another exemplary embodiment of the present disclosure, the default path request message may not include the result of the measuring the channel quality provided by the UE1 1110-1 and can request only to switch to the default path. In this case, the UE1 1110-1 can directly determine whether to switch to the default path.

In step 1111, the D2D server 1160 determines to switch the path between the UE1 1110-1 and the UE2 1110-2 to the default path based on the default path request message. However, according to another exemplary embodiment of the present disclosure, step 1111 can be omitted.

In step 1113, the D2D server 1160 transmits a default path command message to approve the switch to the default path to the UE1 1110-1 via the eNB1 1120-1. The default path command message can include at least one of a D2D bearer ID or a D2D ID of the direct path used for the direct path communication by the UE1 1110-1 and the UE2 1110-2, or an EPS bearer ID, an E-RAB ID, or an S-TMSI of a terminal.

In step 1115, the UE1 1110-1 transmits a default path indication message to a P-GW 1150 via the eNB1 1120-1, and the P-GW 1150 forwards the default path indication message to an S-GW 1140. The default path indication message is encapsulated in a data packet, so that the eNBs 1120, the S-GW 1140, and the P-GW 1150 treat the default path indication message as a data packet. According to another exemplary embodiment of the present disclosure, the UE1 1110-1 can transmit the data packet instead of the default path indication. The data packet is a packet which designates the UE2 1120-2 as a destination and can include data which is defined to switch the path or can include certain data.

In step 1117, the P-GW 1150 identifies the path. That is, the P-GW 1150 identifies a receiver of the default path indication message or the data packet, and identifies the path to the receiver.

In step 1119, the S-GW 1140 transmits a downlink data notification to the MME 1130. In other words, the S-GW 1140 notifies the MME 1130 of existence of the downlink data to be transmitted to the UE2 1110-2.

In step 1121, the MME 1130 transmits a downlink data notification ACK to the S-GW 1140.

In step 1123, the MME 1130 transmits a paging message to the UE2 1110-2. That is, the MME 1130 informs the UE2 1110-2 of the existence of the downlink data.

In step 1125, when the UE2 1110-2 is in the RRC-idle state, the UE2 1110-2 performs a network reentry procedure. The network reentry procedure is a procedure for transitioning from the RRC-idle state to the RRC-connected state and is performed through pre-defined signaling. However, when the UE2 1110-2 has never entered the RRC-idle state during the direct path communication, step 1125 can be omitted.

In step 1127, the UE2 1110-2 enters an RRC/ECM/EMM connection state.

In step 1129, the P-GW 1150 transmits a direct path candidate report to the D2D server 1160. However, according to another exemplary embodiment of the present disclosure, step 1129 can be omitted. The direct path candidate report message can include a bearer ID or an EPS bearer ID between the UE1 1110-1 and the P-GW 1140, or a bearer ID or an EPS bearer ID between the UE2 1110-2 and the P-GW 1140, or can include an IMSI of each of the UE1 1110-1 and the UE2 1110-2 as an identifier of the UE. The direct path candidate report message can use a dedicated D2D ID which is used only for the direct path communication or another identifier of the UE which is known to both the MME 1130 and the P-GW 1150.

In step 1131, the S-GW 1140 transmits the default path indication message or the data packet to the UE2 1110-2 via the eNB2 1120-2.

In step 1133, the D2D server 1160 transmits a location information request on the UE1 1110-1 and the UE2 1110-2 to the MME 1130. In other words, the D2D server 1160 asks the MME 1130, which manages mobility of UEs, about current locations of the UE1 1110-1 and the UE2 1110-2.

In step 1135, the MME 1130 identifies the locations of the UE1 1110-1 and the UE2 1110-2, and transmits a location information response to the D2D server 1160. In other words, the MME 1130 identifies the serving eNBs of the UE1 1110-1 and the UE2 1110-2 and informs the D2D server 1160. Since the MME 1130 manages mobility of UEs, the MME 1130 can know that the UE1 1110-1 and the UE2 1110-2 belong to the eNBs 1120.

In step 1137, the UE2 1110-2 transmits a direct path detach command message to the UE1 1110-1. In other words, the UE2 1110-2 notifies the UE1 1110-1 that the direct path will be detached and communication will be performed via the default path.

In step 1139, the UE2 1110-2 transmits a direct path detach request message to the D2D server 1160 via the eNB2 1120-2. In other words, the UE2 1110-2 requests the D2D server 1160 to end the direct path communication and switch to the default path. The direct path detach request message can include at least one of an MME S1AP UE ID, an EPS bearer ID, and an E-RAB ID as identification information of the UE2 1110-2.

In step 1141, the UE1 1110-1 transmits a direct path detach command ACK to the UE2 1120-2. Accordingly, the UE2 1120-2 determines that the direct path detach command message has been transmitted to the UE1 1110-1.

In step 1143, the D2D server 1160 determines to switch the path between the UE1 1110-1 and the UE2 1110-2 to the default path based on the direct path detach request message.

In step 1145, the D2D server 1160 transmits a direct path detach response message to the UE2 1110-2. That is, the D2D server 1160 notifies the UE2 1110-2 that the switch to the default path has been approved. In the exemplary embodiment illustrated in FIG. 11, the UE2 1110-2 transmits the direct path detach command to the UE1 1110-1 before proceeding to step 1145. However, according to another exemplary embodiment of the present disclosure, when the UE2 1110-2 transmits the direct path detach command to the UE1 1110-1 after receiving the direct path detach response, the D2D server 1160 can reject the switch to the default path. In this case, the D2D server 1160 can add an indicator informing the rejection of the switch to the default path to the direct path detach response, and accordingly, the UE2 1110-2 does not transmit the direct path detach command.

In step 1147, the D2D server 1160 updates D2D pair candidate information. Specifically, the D2D server 160 updates the path between the UE1 1110-1 and the UE2 1110-2 with the default path. Furthermore, according to another exemplary embodiment of the present disclosure, the D2D server 1160 can delete the pair of the UE1 1110-1 and the UE2 1110-2 from the D2D pair candidate information. For example, the D2D server 1160 can determine whether to delete the pair of the UE1 1110-1 and the UE2 1110-2 based on the channel quality of the direct path between the UE1 1110-1 and the UE2 1110-2, or a network condition (e.g., a cellular network capacity, the number of connected UEs, an estimated throughput, etc.).

In step 1149, the UE2 1110-2 transmits a D2D detach confirm message to the UE1 1110-1. Accordingly, the direct path is detached and the path between the UE1 1110-1 and the UE2 1110-2 switches to the direct path. In this case, the UE1 1110-1 and the UE2 1110-2 can transit a D2D communication module to an idle state to save power.

In the exemplary embodiment illustrated in FIG. 11, the UE1 1110-1 requests the D2D server 1140 to switch to the default path and the MME 1130 controls the UE2 1110-2 to reenter the network through the paging procedure. However, according to another exemplary embodiment of the present disclosure, the paging procedure can be omitted. That is, since the UE2 1110-2 as well as the UE1 1110-1 recognizes that it is necessary to switch to the default path through steps 1101 to 1105, both the UE1 1110-1 and the UE2 1110-2 can request the D2D server 1140 to switch to the default path. In this case, the UE1 1110-1 and the UE2 1110-2 can switch to the default path without going through the paging procedure. Another exemplary embodiment in which the paging procedure is omitted will be explained below with reference to FIG. 12.

Figure 12:
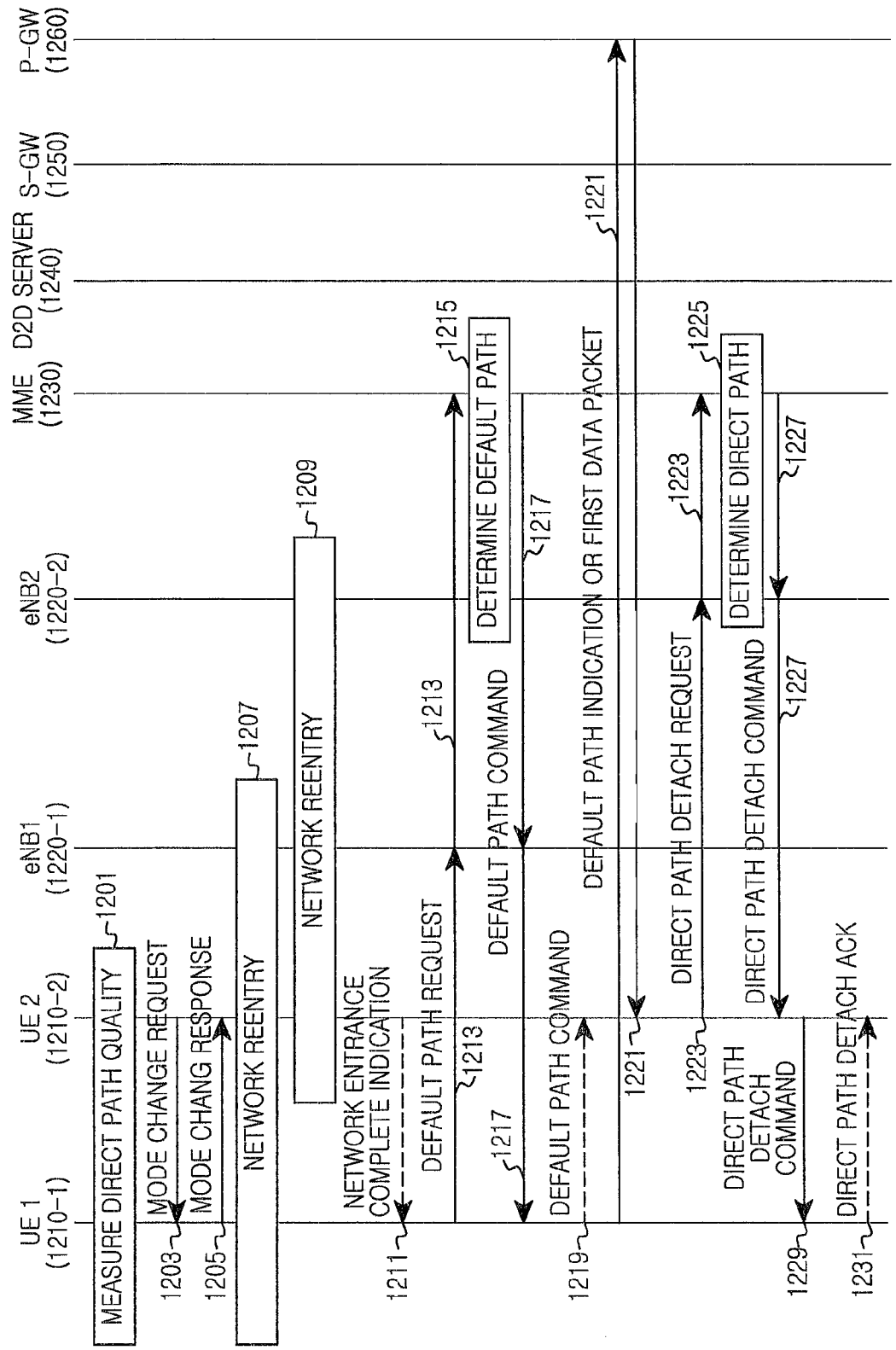
FIG. 12 illustrates a signaling for switching a communication path in a wireless communication system according to another exemplary embodiment of the present disclosure.

FIG. 12 illustrates signaling for switching a communication path in a wireless communication system according to another exemplary embodiment of the present disclosure. FIG. 12 illustrates a case in which UEs having different serving eNBs switch from a direct path to a default path, and illustrates an exemplary embodiment in which a D2D server is configured as a separate entity.

Referring to FIG. 12, in step 1201, at least one of UE1 1210-1 and UE2 1210-2 measures a channel state of the direct path with the other in the process of communicating with each other via the direct path. For example, the UE1 1210-1 and the UE2 1210-2 each can measure the channel state by using a signal of a pre-defined value transmitted from the other.

In step 1203, when the UE1 1210-1 determines to switch to the default path for some reason such as deterioration in the channel of the direct path, the UE1 1210-1 transmits a mode change request message to the other UE that the UE1 1210-1 communicates with via the direct path, that is, the UE2 1210-2. The mode change request message includes a channel condition measured by the UE1 1210-1, cellular connection information, etc., and is to request to switch to the default path.

In step 1205, when the UE2 1210-2 determines to switch to the default path, the UE2 1210-2 transmits a mode change response message. The mode change response message includes a channel condition measured by the UE2 1210-2, cellular connection information, etc., and is to approve the switch to the default path.

In step 1207, the UE1 1210-1 performs a network reentry procedure to switch to the default path. The network reentry procedure is a procedure for transitioning from an RRC-idle state to an RRC-connected state and is performed through pre-defined signaling. However, when the UE1 1210-1 has never entered the RRC-idle state during the direct path communication, step 1207 can be omitted.

In step 1209, the UE2 1210-2 performs a network reentry procedure to switch to the default path. The network reentry procedure is a procedure for transitioning from the RRC-idle state to the RRC-connected state and is performed through pre-defined signaling. However, when the UE2 1210-2 has never entered the RRC-idle state during the direct path communication, step 1209 can be omitted.

In step 1211, the UE2 1210-2 transmits a network entry complete indication to the UE1 1210-1. In other words, the UE2 1210-2 notifies the UE1 1210-1 that the UE2 1210-2 has entered the network.

In step 1213, the UE1 1210-1 transmits a default path request message to request to switch to the default path to a D2D server 1240 via an eNB1 1220-1. In this case, according to an exemplary embodiment of the present disclosure, the default path request message can include the result of the measuring the channel quality of the UE1 1210-1. According to another exemplary embodiment of the present disclosure, the default path request message may not include the result of the measuring the channel quality provided by the UE1 1210-1 and can request only to switch to the default path. In this case, the UE1 1210-1 can directly determine whether to switch to the default path.

In step 1215, the D2D server 1240 determines to switch the path between the UE1 1210-1 and the UE2 1210-2 to the default path based on the default path request message. However, according to another exemplary embodiment of the present disclosure, step 1215 can be omitted. For example, this is because the D2D server 1240 can accept the determination of the UEs 1210 on whether to switch the path. In this case, when mobility-related information of the UE1 1210-1 and the UE2 1210-2 is required to determine whether to switch to the default path, the D2D server 1240 can acquire the necessary information from an MME 1230.

In step 1217, the D2D server 1240 transmits a default path command message to approve the switch to the default path to the UE1 1210-1 via the eNB1 1220-1. The default path command message can include at least one of a D2D bearer ID or a D2D ID of the direct path used for the direct path communication by the UE1 1210-1 and the UE2 1210-2, or an EPS bearer ID, an E-RAB ID, or an S-TMSI of a terminal.

In step 1219, the UE1 1210-1 transmits the default path command message to approve the switch to the default path to the UE2 1210-2. Accordingly, the UE2 1210-2 identifies that the switch to the default path has been approved.

In step 1221, the UE1 1210-1 transmits a default path indication message to a P-GW 1250 via the eNB1 1220-1, and the P-GW 1250 forwards the default path indication message to the UE2 1210-2. The default path indication message is encapsulated in a data packet, so that the eNBs 1220, an S-GW 1240, and the P-GW 1250 treat the default path indication message as a data packet. According to another exemplary embodiment of the present disclosure, the UE1 1210-1 can transmit the data packet instead of the default path indication. The data packet is a packet which designates the UE2 1220-2 as a destination and can include data which is defined to switch the path or can include certain data.

In step 1223, the UE2 1210-2 transmits a direct path detach request message to the D2D server 1240 via an eNB2 1220-2. In other words, the UE2 1210-2 requests the D2D server 1240 to end the direct path communication and switch to the default path. The direct path detach request message can include at least one of an MME S1AP UE ID, an EPS bearer ID, and an E-RAB ID as identification information of the UE2 1210-2.

In step 1225, the D2D server 1240 determines to switch the path between the UE1 1210-1 and the UE2 1210-2 to the default path based on the direct path detach request message. In this case, when mobility-related information of the UE1 1210-1 and the UE2 1210-2 is required to determine whether to switch to the default path, the D2D server 1240 can acquire the necessary information from an MME 1230. Alternatively, the switch to the default path can be rejected for some reason such as a problem in a cellular network. In this case, a direct path detach response may not be transmitted or a direct path detach rejection message can be transmitted to explicitly inform the rejection. In this case, the UE1 1210-1 and the UE2 1210-2 continue to communicate with each other via the direct path. Thereafter, the UE1 1210-1 and the UE2 1210-2 can request to switch to the default path again according to an exemplary embodiment.

In step 1227, the D2D server 1240 transmits a direct path detach command message to the UE2 1210-2. That is, the D2D server 1240 notifies the UE2 1210-2 that the switch to the default path has been approved.

In step 1229, the UE2 1210-2 transmits the direct path detach command message to the UE1 1210-1. Accordingly, the UE1 1210-1 identifies that the direct path is instructed to be detached. In step 1231, the UE1 1210-1 transmits a direct path detach ACK to the UE2 1210-2.

Figure 13:
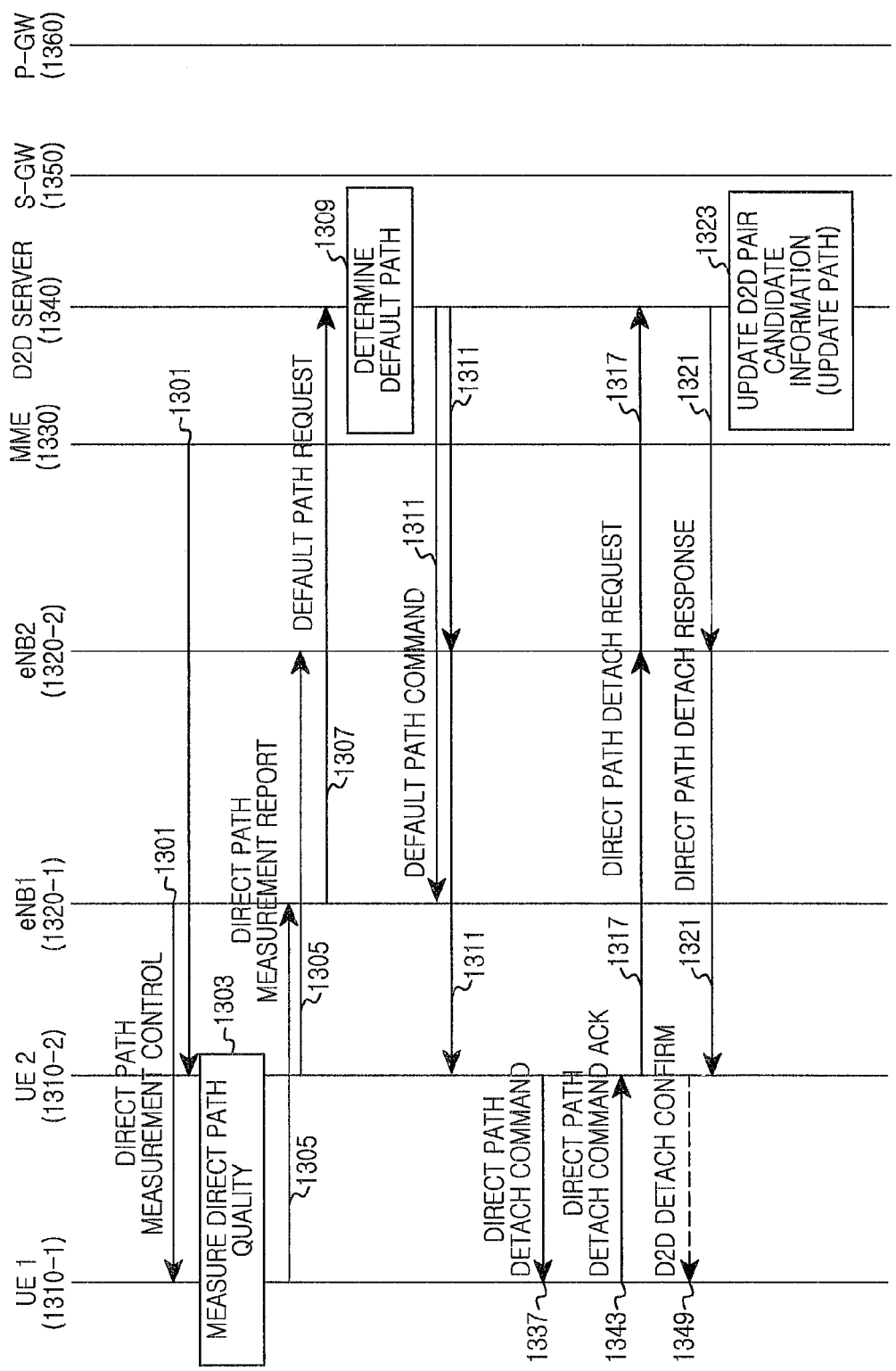
FIG. 13 illustrates a signaling for switching a communication path in a wireless communication system according to another exemplary embodiment of the present disclosure.

FIG. 13 illustrates signaling for switching a communication path in a wireless communication system according to another exemplary embodiment of the present disclosure. FIG. 13 illustrates a case in which UEs having different serving eNBs switch from a direct path to a default path, and illustrates an exemplary embodiment in which a D2D server is configured as a separate entity.

Referring to FIG. 13, in step 1301, an eNB1 1320-1 and an eNB2 1320-2 transmit a direct path measurement control message to instruct to measure a channel state of the direct path to UE1 1310-1 and UE2 1310-2, respectively. The direct path measurement control message can include at least one of resource allocation information necessary for measuring the channel state, a resource allocation time, a reference signal code, a direct path measurement report message generating condition, and resource information to be used for transmitting a direct path measurement report message. For example, the direct path measurement report message generating condition includes a condition that at least one designated from among received power of a reference signal, an SIR, and an SINR exceeds a threshold value.

In step 1303, the UE1 1310-1 and the UE2 1310-2 each measure a channel state of the direct path with the other. To achieve this, the eNB1 1320-1 and the eNB2 1320-2 can allocate radio resources for measuring the channel. For example, the UE1 1310-1 and the UE2 1310-2 each can measure the channel state by using a signal of a pre-defined value transmitted from the other.

In step 1305, the UE1 1310-1 and the UE2 1310-2 each transmit a direct path measurement report indicating the channel state of the direct path to the eNB1 1320-1 and the eNB2 1320-2, respectively. The direct path measurement report includes measured direct path quality information. For example, the direct path quality information can include at least one of received power of a reference signal, an SIR, and an SINR. In addition, the direct path measurement report can include a reporting condition which is designated by the direct path measurement control message. To achieve this, the eNB1 1320-1 and the eNB2 1320-2 can allocate radio resources for transmitting the result of the measuring. This is because the eNB1 1320-1 and the eNB2 1320-2 control the measuring procedure unlike in the exemplary embodiment illustrated in FIG. 10.

In step 1307, the eNB1 1320-1 transmits a default path request message to request to switch to the default path to a D2D server 1360. In this case, according to an exemplary embodiment of the present disclosure, the default path request message can include the result of the measuring the channel quality provided by the UE1 1310-1. According to another exemplary embodiment of the present disclosure, the default path request message may not include the result of the measuring the channel quality provided by the UE1 1310-1 and can request only to switch to the default path. In this case, the eNB1 920-1 can directly determine whether to switch to the default path.

In step 1309, the D2D server 1360 determines to switch the path between the UE1 1310-1 and the UE2 1310-2 to the default path based on the default path request message. Alternatively, the switch to the default path can be rejected for some reason such as a problem in a cellular network. In this case, a direct path detach response may not be transmitted or a direct path detach rejection message can be transmitted to explicitly inform the rejection. In this case, the UE1 1310-1 and the UE2 1310-2 continue to communicate with each other via the direct path. Thereafter, the UE1 1310-1 and the UE2 1310-2 can request to switch to the default path again according to an exemplary embodiment.

In step 1311, the D2D server 1360 transmits a default path command message to approve the switch to the default path to the eNB1 1320-1 and the eNB2 1320-2. The default path command message can include at least one of a D2D bearer ID or a D2D ID of the direct path used for the direct path communication by the UE1 1310-1 and the UE2 1310-2, or an EPS bearer ID, an E-RAB ID, or an S-TMSI of a terminal. In addition, the eNB2 1320-2 transmits the default path command message to the UE2 1310-2.

In step 1313, the UE2 1310-2 transmits a direct path detach command message to the UE1 1310-1. In other words, the UE2 1310-2 notifies the UE1 1310-1 that the direct path will be detached and communication will be performed via the default path.

In step 1315, the UE1 1310-1 transmits a direct path detach command ACK to the UE2 1320-2. Accordingly, the UE2 1320-2 determines that the direct path detach command message has been transmitted to the UE1 1310-1.

In step 1317, the UE2 1310-2 transmits a direct path detach request message to the D2D server 1330 via the eNB2 1320-2. In other words, the UE2 1310-2 requests the D2D server 1360 to end the direct path communication and switch to the default path. The direct path detach request message can include at least one of an MME S1AP UE ID, an EPS bearer ID, and an E-RAB ID as identification information of the UE2 1310-2.

In step 1319, the UE2 1310-2 transmits a direct path detach confirm message to the UE1 1310-1. Accordingly, the direct path is detached and the path between the UE1 1310-1 and the UE2 1310-2 switches to the default path. In this case, the UE1 1310-1 and the UE2 1310-2 can transit a D2D communication module to an idle state to save power.

In step 1321, the D2D server 1360 transmits a direct path detach response message to the UE2 1310-2. That is, the D2D server 1360 notifies the UE2 1310-2 that the switch to the default path has been approved.

In step 1323, the D2D server 1360 updates D2D pair candidate information. Specifically, the D2D server 1360 updates the path between the UE1 1310-1 and the UE2 1310-2 with the default path. Furthermore, according to another exemplary embodiment of the present disclosure, the D2D server 1360 can delete the pair of the UE1 1310-1 and the UE2 1310-2 from the D2D pair candidate information. For example, the D2D server 1360 can determine whether to delete the pair of the UE1 1310-1 and the UE2 1310-2 based on the channel quality of the direct path between the UE1 1310-1 and the UE2 1310-2, or a network condition (e.g., a cellular network capacity, the number of connected UEs, an estimated throughput, etc.).

Figure 14:
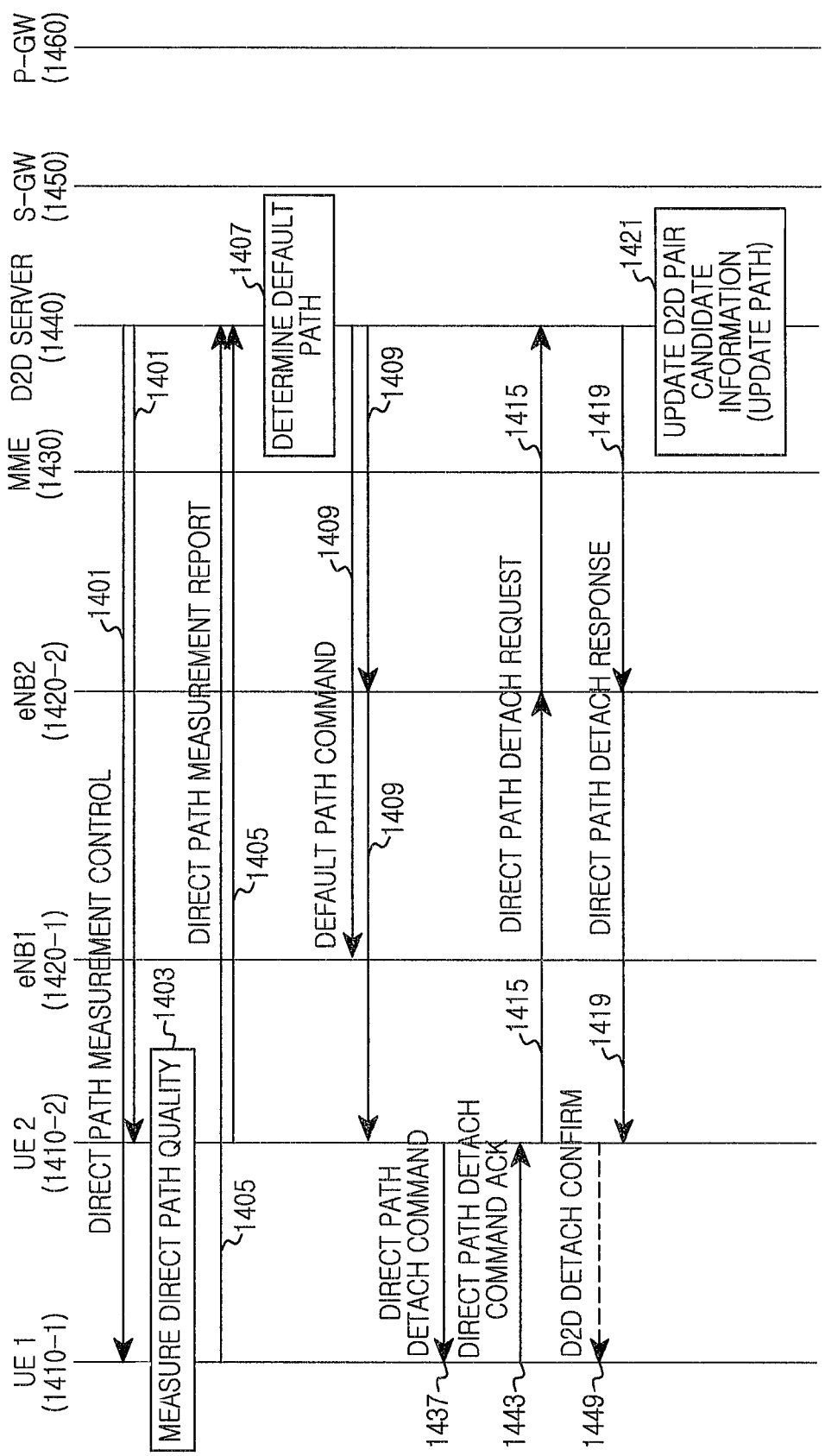
FIG. 14 illustrates a signaling for switching a communication path in a wireless communication system according to another exemplary embodiment of the present disclosure.

FIG. 14 illustrates signaling for switching a communication path in a wireless communication system according to another exemplary embodiment of the present disclosure. FIG. 14 illustrates a case in which UEs having different serving eNBs switch from a direct path to a default path, and illustrates an exemplary embodiment in which functions of a D2D server is configured as a separate entity.

Referring to FIG. 14, in step 1401, a D2D server 1460 transmits a direct path measurement control message to instruct to measure a channel state of a direct path to UE1 1410-1 and UE2 1410-2. The direct path measurement control message can include at least one of resource allocation information necessary for measuring the channel state, a resource allocation time, a reference signal code, a direct path measurement report message generating condition, and resource information to be used for transmitting the direct path measurement report message. For example, the direct path measurement report message generating condition includes a condition that at least one designated from among received power of a reference signal, an SIR, and an SINR exceeds a threshold value.

In step 1403, the UE1 1410-1 and the UE2 1410-2 each measure a channel state of the direct path with the other. To achieve this, the eNB1 1420-1 and the eNB2 1420-2 can allocate radio resources for measuring the channel. For example, the UE1 1410-1 and the UE2 1410-2 each can measure the channel state by using a signal of a pre-defined value transmitted from the other.

In step 1405, the UE1 1410-1 and the UE2 1410-2 each transmit a direct path measurement report indicating the channel state of the direct path to the D2D server 1460. The direct path measurement report includes measured direct path quality information. For example, the direct path quality information can include at least one of received power of a reference signal, an SIR, and an SINR. In addition, the direct path measurement report can include a reporting condition which is designated by the direct path measurement control message. To achieve this, the eNB1 1420-1 and the eNB2 1420-2 can allocate radio resources for transmitting the result of the measuring. This is because the D2D server 1460 controls the measuring procedure unlike in the exemplary embodiment illustrated in FIG. 11.

In step 1407, the D2D server 1460 determines to switch the path between the UE1 1410-1 and the UE2 1410-2 to the default path based on the direct path measurement report. When the switch to the default path is rejected, subsequent steps may not be performed.

In step 1409, the D2D server 1460 transmits a default path command message to approve the switch to the default path to the eNB1 1420-1 and the eNB2 1420-2. The default path command message can include at least one of a D2D bearer ID or a D2D ID of the direct path used for the direct path communication by the UE1 1410-1 and the UE2 1410-2, or an EPS bearer ID, an E-RAB ID, or an S-TMSI of a terminal. The eNB2 1420-2 transmits the default path command message to the UE2 1410-2.

In step 1411, the UE2 1410-2 transmits a direct path detach command message to the UE1 1410-1. In other words, the UE2 1410-2 notifies the UE1 1410-1 that the direct path will be detached and communication will be performed via the default path.

In step 1413, the UE1 1410-1 transmits a direct path detach command ACK to the UE2 1420-2. Accordingly, the UE2 1420-2 determines that the direct path detach command message has been transmitted to the UE1 1410-1.

In step 1415, the UE2 1410-2 transmits a direct path detach request message to the D2D server 1460 via the eNB2 1420-2. In other words, the UE2 1410-2 requests the D2D server 1460 to end the direct path communication and switch to the default path. The direct path detach request message can include at least one of an MME S1AP UE ID, an EPS bearer ID, and an E-RAB ID as identification information of the UE2 1410-2.

In step 1417, the UE2 1410-2 transmits a direct path detach confirm message to the UE1 1410-1. Accordingly, the direct path is detached and the path between the UE1 1410-1 and the UE2 1410-2 switches to the default path. In this case, the UE1 1410-1 and the UE2 1410-2 can transit a D2D communication module to an idle state to save power.

In step 1419, the D2D server 1460 transmits a direct path detach response message to the UE2 1410-2. That is, the D2D server 1460 notifies the UE2 1410-2 that the switch to the default path has been approved.

In step 1421, the D2D server 1460 updates D2D pair candidate information. Specifically, the D2D server 1460 updates the path between the UE1 1410-1 and the UE2 1410-2 with the default path. Furthermore, according to another exemplary embodiment of the present disclosure, the D2D server 1460 can delete the pair of the UE1 1410-1 and the UE2 1410-2 from the D2D pair candidate information. For example, the D2D server 1460 can determine whether to delete the pair of the UE1 1410-1 and the UE2 1410-2 based on the channel quality of the direct path between the UE1 1410-1 and the UE2 1410-2, or a network condition (e.g., a cellular network capacity, the number of connected UEs, an estimated throughput, etc.).

Figure 15:
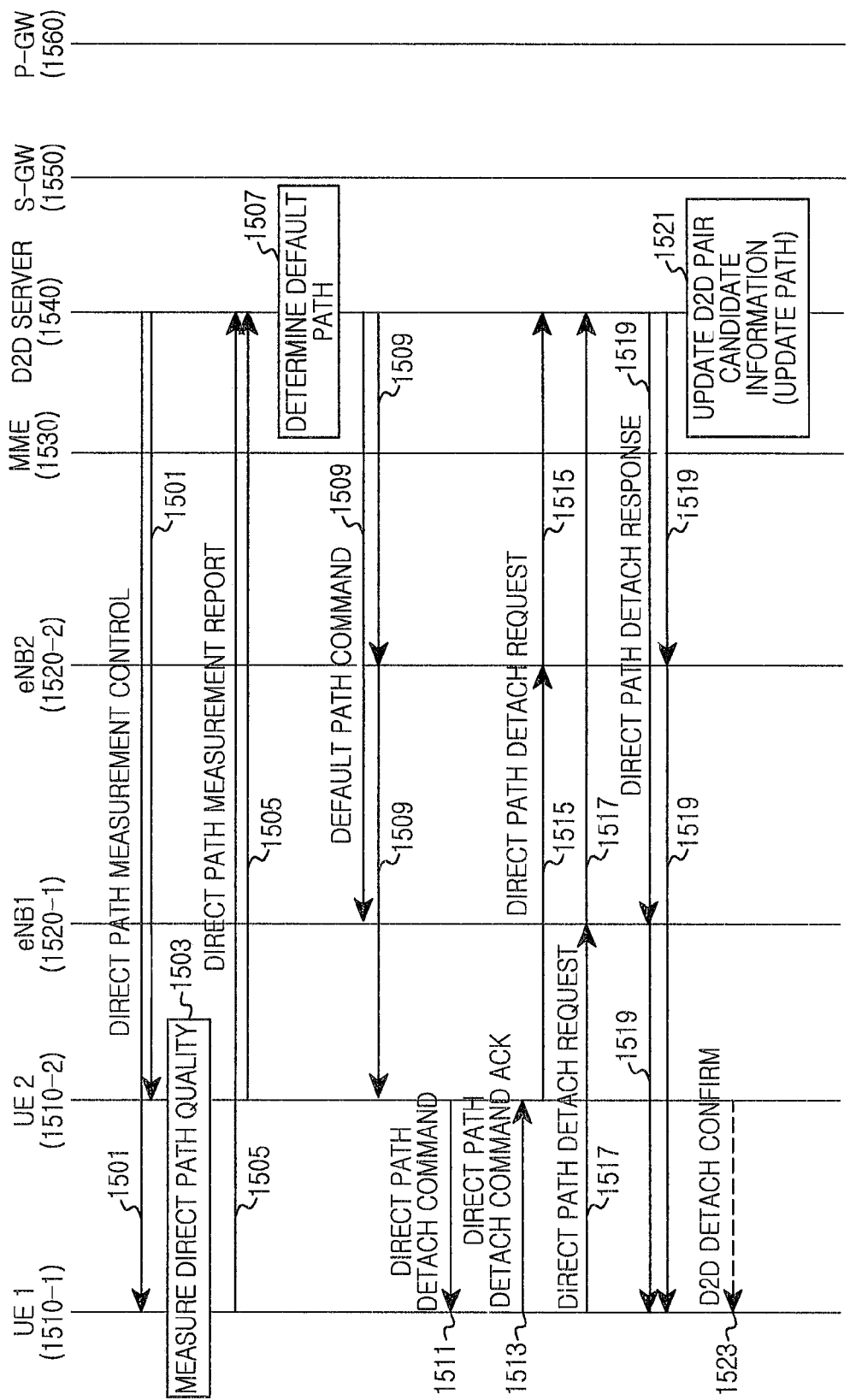
FIG. 15 illustrates a signaling for switching a communication path in a wireless communication system according to another exemplary embodiment of the present disclosure.

FIG. 15 illustrates signaling for switching a communication path in a wireless communication system according to another exemplary embodiment of the present disclosure. FIG. 15 illustrates a case in which UEs having different serving eNBs switch from a direct path to a default path, and illustrates an exemplary embodiment in which a D2D server is configured as a separate entity.

Referring to FIG. 15, in step 1501, a D2D server 1560 transmits a direct path measurement control message to instruct to measure a channel state of a direct path to UE1 1510-1 and UE2 1510-2. The direct path measurement control message can include at least one of resource allocation information necessary for measuring the channel state, a resource allocation time, a reference signal code, a direct path measurement report message generating condition, and resource information to be used for transmitting a direct path measurement report message. For example, the direct path measurement report message generating condition includes a condition that at least one designated from among received power of a reference signal, an SIR, and an SINR exceeds a threshold value.

In step 1503, the UE1 1510-1 and the UE2 1510-2 each measure a channel state of the direct path with the other. To achieve this, the eNB1 1520-1 and the eNB2 1520-2 can allocate radio resources for measuring the channel. For example, the UE1 1510-1 and the UE2 1510-2 each can measure the channel state by using a signal of a pre-defined value transmitted from the other.

In step 1505, the UE1 1510-1 and the UE2 1510-2 each transmit a direct path measurement report indicating the channel state of the direct path to the D2D server 1560. The direct path measurement report includes measured direct path quality information. For example, the direct path quality information can include at least one of received power of a reference signal, an SIR, and an SINR. In addition, the direct path measurement report can include a reporting condition which is designated by the direct path measurement control message. To achieve this, the eNB1 1520-1 and the eNB2 1520-2 can allocate radio resources for transmitting the result of the measuring. This is because the D2D server 1560 controls the measuring procedure unlike in the exemplary embodiment illustrated in FIG. 11.

In step 1507, the D2D server 1560 determines to switch the path between the UE1 1510-1 and the UE2 1510-2 to the default path based on the direct path measurement report. When the switch to the default, path is rejected, subsequent steps may not be performed.

In step 1509, the D2D server 1560 transmits a default path command message to approve the switch to the default path to the eNB1 1520-1 and the eNB2 1520-2. The default path command message can include at least one of a D2D bearer ID or a D2D ID of the direct path used for the direct path communication by the UE1 1510-1 and the UE2 1510-2, or an EPS bearer ID, an E-RAB ID, or an S-TMSI of a terminal. The eNB2 1520-2 transmits the default path command message to the UE2 1510-2.

In step 1511, the UE2 1510-2 transmits a direct path detach command message to the UE1 1510-1. In other words, the UE2 1510-2 notifies the UE1 1510-1 that the direct path will be detached and communication will be performed via the default path.

In step 1513, the UE1 1510-1 transmits a direct path detach command ACK to the UE2 1520-2. Accordingly, the UE2 1520-2 determines that the direct path detach command message has been transmitted to the UE1 1510-1.

In step 1515, the UE2 1510-2 transmits a direct path detach request message to the D2D server 1560 via the eNB2 1520-2. In other words, the UE2 1510-2 requests the D2D server 1560 to end the direct path communication and switch to the default path. The direct path detach request message can include at least one of an MME S1AP UE ID, an EPS bearer ID, and an E-RAB ID as identification information of the UE2 1510-2.

In step 1517, the UE1 1510-1 transmits a direct path detach request message to the D2D server 1560 via the eNB1 1520-1. In other words, the UE1 1510-1 requests the D2D server 1560 to end the direct path communication and switch to the default path. The direct path detach request message can include at least one of an MME S1AP UE ID, an EPS bearer ID, and an E-RAB ID as identification information of the UE2 1510-1.

In step 1519, the D2D server 1560 transmits a direct path detach response message to the UE1 1510-1 and the UE2 1510-2. That is, the D2D server 1560 notifies the UE1 1510 and the UE2 1510-2 that the switch to the default path has been approved.

In step 1521, the D2D server 1560 updates D2D pair candidate information. Specifically, the D2D server 1560 updates the path between the UE1 1510-1 and the UE2 1510-2 with the default path. Furthermore, according to another exemplary embodiment of the present disclosure, the D2D server 1560 can delete the pair of the UE1 1510-1 and the UE2 1510-2 from the D2D pair candidate information. For example, the D2D server 1560 can determine whether to delete the pair of the UE1 1510-1 and the UE2 1510-2 based on the channel quality of the direct path between the UE1 1510-1 and the UE2 1510-2, or a network condition (e.g., a cellular network capacity, the number of connected UEs, an estimated throughput, etc.).

In step 1523, the UE2 1510-2 transmits a direct path detach confirm message to the UE1 1510-1. Accordingly, the direct path is detached and the path between the UE1 1510-1 and the UE2 1510-2 switches to the default path. In this case, the UE1 1510-1 and the UE2 1510-2 can transit a D2D communication module to an idle state to save power.

Figure 16:
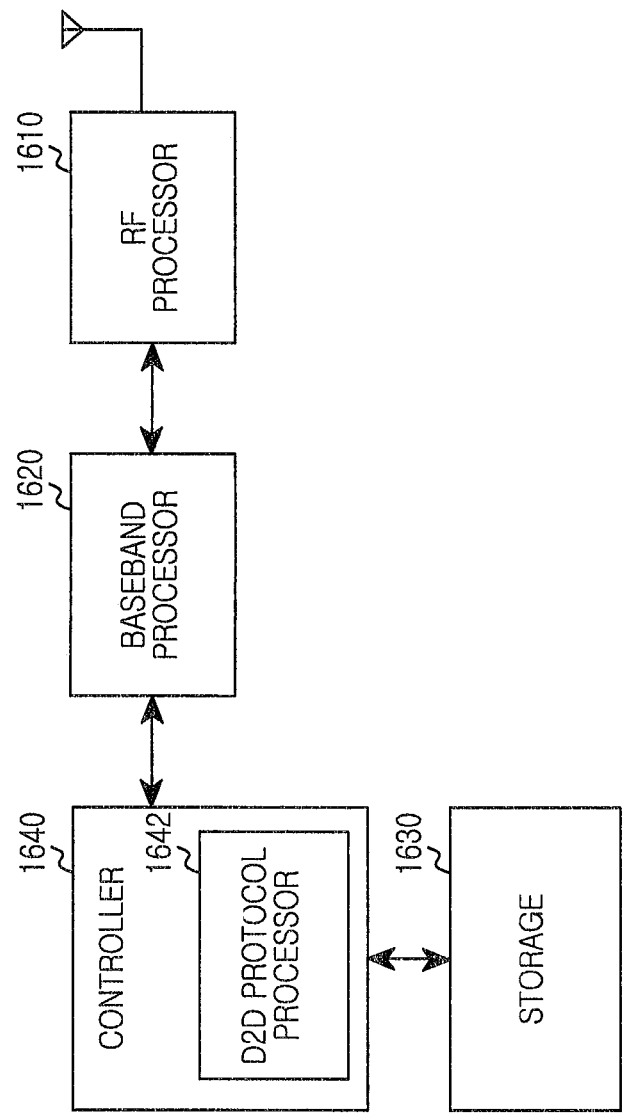
FIG. 16 is a block diagram illustrating a configuration of User Equipment (UE) in a wireless communication system according to an exemplary embodiment of the present disclosure.

FIG. 16 illustrates a block configuration of a UE in a wireless communication system according to an exemplary embodiment of the present disclosure.

Referring to FIG. 16, the UE includes a Radio Frequency (RF) processor 1610, a baseband processor 1620, a storage 1630, and a controller 1640.

The RF processor 1610 performs functions of transmitting and receiving signals via a radio channel, such as band conversion or amplification of signals. That is, the RF processor 1610 up-converts a baseband signal provided from the baseband processor 1620 into an RF band signal and then transmits the RF band signal via an antenna, and down-converts an RF band signal received via the antenna into a baseband signal. For example, the RF processor 1610 can include a transmission filter, a reception filter 1612, an amplifier, a mixer, an oscillator, a Digital to Analog Converter (DAC), an Analog to Digital Converter (ADC), etc. Although a single antenna is illustrated in FIG. 16, the UE can include a plurality of antennas. In addition, the RF processor 1610 can include a plurality of RF chains.

The baseband processor 1620 performs a function of converting between a baseband signal and a bit string according to a physical layer standard of a system. For example, in transmitting data, the baseband processor 1620 generates complex symbols by encoding and modulating a transmission bit string. In addition, in receiving data, the baseband processor 1620 restores a reception bit string by demodulating and decoding a baseband signal provided from the RF processor 1610. For example, in transmitting data according to an OFDM scheme, the baseband processor 1620 generates complex symbols by encoding and modulating a transmission bit string, maps the complex symbols onto subcarriers, and then configures OFDM symbols by performing an Inverse Fast Fourier Transform (IFFT) operation and Cyclic Prefix (CP) insertion. In addition, in receiving data, the baseband processor 1620 divides a baseband signal provided from the RF processor 1610 on an OFDM symbol basis, restores signals mapped onto subcarriers by performing a Fast Fourier Transform (FFT) operation, and then restores a reception bit string by demodulating and decoding.

The baseband processor 1620 and the RF processor 1610 transmit and receive signals as described above. Accordingly, the baseband processor 1620 and the RF processor 1610 can be referred to as a transmitter, a receiver, or a transceiver.

The storage 1630 stores data such as a basic program, an application program, setting information, etc. for operating the UE. In addition, the storage 1630 provides the stored data according to a request of the controller 1640.

The controller 1640 controls overall operations of the UE. For example, the controller 1640 transmits and receives signals via the baseband processor 1620 and the RF processor 1610. According to an exemplary embodiment of the present disclosure, the controller 1640 includes a D2D protocol processor 1642 to control signaling for D2D communication. For example, the controller 1640 controls the UE to operate as shown in FIGS. 3 to 15. The operations of the controller 1640 according to exemplary embodiments of the present disclosure are as follows.

The controller 1630 measures a channel quality of a direct path with the other UE. For example, a higher entity can be an eNB, an MME, or a D2D server. The channel quality of the direct path can be measured according to a direct path measurement command of the higher entity, periodically during the direct path communication, or when a specific event occurs. To achieve this, the controller 1630 can use resources which are allocated by the serving eNB to measure the channel quality. In addition, the controller 1630 transmits a channel quality measurement report on the direct path to the higher entity. In this case, when the UE communicates via the direct path, the controller 1630 determines to switch to a default path based on the channel quality, transmits a path switch request to the other UE, and receives a path switch response.

While the UE is in the process of communicating via the default path, the controller 1630 identifies a switch command to switch to the direct path which is received from the higher entity, sets the direct path with the other UE, and switches to the direct path. In addition, the controller 1630 can notify the higher entity that the direct path has been set. When the path switches to the direct path, the controller 1630 can transit to an RRC-idle state.

When the path switches from the default path to the direct path, an IP address for direct path communication is required. To achieve this, the controller 1630 can be allocated an IP address to be used in the direct path communication by a device which allocates an IP in an initial accessing procedure. When a unique IP address for each terminal such as IPv6 is allocated, the same IP address can be used regardless of which path is used.

While the UE is in the process of communicating via the direct path, the controller 1630 identifies a direct path detach command received from the higher entity, detaches the direct path with the other UE, and switches to the default path. In addition, the controller 1630 can notify the higher entity that the direct path has been detached. In this case, when the UE transits to the RRC-idle state when switching to the direct path, the controller 1630 can further perform a network reentry procedure.

While the UE is in the process of communicating via the direct path, the controller 1630 can determine whether to detach the direct path based on a channel quality of the direct path. In this case, the controller 1630 can request the higher entity to switch to the default path.

Figure 17:
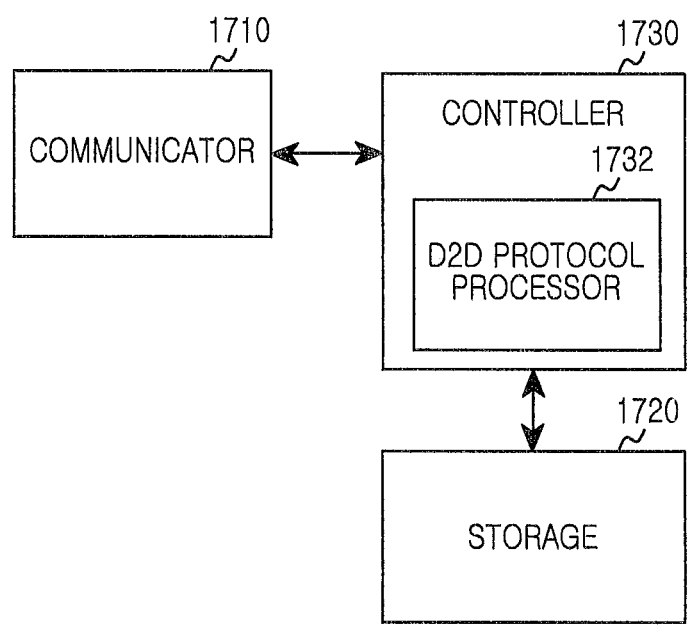
FIG. 17 is a block diagram illustrating a configuration of a network entity in a wireless communication system according to an exemplary embodiment of the present disclosure.

FIG. 17 illustrates a block configuration of a network entity in a wireless communication system according to an exemplary embodiment of the present disclosure.

Referring to FIG. 17, the network entity includes a communicator 1710, a storage 1720, and a controller 1730.

The communication unit 1710 provides an interface for exchanging information with another entity via a network. The communication unit 1710 can be referred to as a network card, an Ethernet card, an Ethernet adaptor, a Network Interface Card (NIC), etc. The network entity can be one of an eNB, an MME, a P-GW, an S-GW, and a D2D server. When the network entity is the eNB, the communication unit 1710 can include both a wireless interface and a wired interface. The wired interface can include an RF processor and a baseband processor. The communication unit 1710 transmits and receives signals as described above. Accordingly, the communication unit 1710 can be referred to as a transmitter, a receiver, or a transceiver.

The storage 1720 stores data such as a basic program, an application program, setting information, etc. for operating the network entity. In particular, when the network entity is a D2D server or an entity equipped with a D2D function, the storage 1720 stores D2D candidate pair information. In addition, the storage 1720 provides stored data according to a request of the controller 1730.

The controller 1730 controls overall operations of the network entity. For example, the controller 1730 transmits and receives signals via the baseband processor 1720 and the RF processor 1710. According to an exemplary embodiment of the present disclosure, the controller 1730 includes a D2D protocol processor 1742 to control signaling for D2D communication. For example, the controller 1730 controls the network entity to operate like one of the eNB, the MME, the P-GW, the S-GW, and the D2D server shown in FIGS. 3 to 15. The operations of the controller 1730 according to exemplary embodiments of the present disclosure are as follows.

When the network entity is the eNB, the controller 1730 operates as follows.

Regarding the UEs communicating with one another via the default path, the controller 1730 identifies a direct path measurement command received from the higher entity, and transmits a message or a signal to request the UE indicated by the direct path measurement command to measure a channel quality of the direct path with the other UE. Thereafter, when a channel quality measurement report on the direct path is received from the UE, the controller 1730 notifies the higher entity of the channel quality measurement result. In this case, according to an exemplary embodiment of the present disclosure, the controller 1730 can determine to switch to the direct path based on at least one of the channel quality and a current network condition.

Regarding the UEs communicating with one another via the direct path, the controller 1730 transmits a message or a signal to request the UE which communicates via the direct path to measure a channel quality of the direct path according a self-determination. Thereafter, when a channel quality measurement report on the direct path is received from the UE, the controller 1730 determines to switch to the default path based on at least one of the channel quality and a current network condition, and requests the higher entity, which controls the path switch, to switch to the default path.

When the network entity performs the D2D function, namely, the network entity is the MME equipped with the D2D server or the D2D function, the controller 1730 operates as follows: Regarding UEs communicating with one another via the default path, when the controller 1730 is notified that the UEs communicating with one another via the default path are a candidate pair which is able to communicate via the direct path, the controller 1730 identifies locations of the UEs (e.g., cell, TA), and adds the pair of the UEs to the D2D candidate pair information stored in the storage 1720. In this case, when the network entity is a separate D2D server, the controller 1730 can identify the locations of the UEs by asking the MME. Thereafter, the controller 1730 instructs the UEs to measure a channel quality of the direct path via the lower enhanced Node B (eNB). Accordingly, when a result of measuring the channel quality is notified by the UEs, the controller 1730 determines to switch to the direct path based on at least one of the channel quality and a current network condition. According to an exemplary embodiment of the present disclosure, the switch to the direct path can be determined by the lower eNB. In addition, the controller 1730 notifies the approval of the switch to the direct path and is notified by at least one of the UEs that the path has switched to the direct path. Accordingly, the controller 1730 updates the path of the pair of the UEs in the D2D candidate pair information stored in the storage 1720 with the direct path.

Regarding UEs communicating with one another via the direct path, when a switch to the default path is requested by at least one of the UEs, the controller 1730 determines to switch to the default path based on at least one of a channel quality of the direct path and a current network condition, and transmits a message or a signal to instruct to switch to the default path. Thereafter, when a direct path detach request is received from at least one of the UEs, the controller 1730 determines to switch to the default path based on at least one of the channel quality of the direct path and the current network condition, and transmits a message or a signal to approve of detaching the direct path. According to an exemplary embodiment of the present disclosure, one of the two determining operations described above can be omitted. Thereafter, the controller 1730 updates the path of the pair of the UEs in the D2D candidate pair information stored in the storage 1720 with the default path. Furthermore, when the entity is the MME equipped with a D2D function, the controller 1730 receives a request for a switch to the default path and then performs paging with respect to the other UE.

When the network entity is the P-GW, the controller 1730 operates as follows. The controller 1730 identifies paths of the UEs communicating with one another via the default path, and, when packets exchanged between the UEs are not transmitted to an external network, notifies the network entity equipped with the D2D function of this.

The terminals which performs D2D communication in a wireless communication system use radio resources effectively and thus increases a transmission rate and a throughput.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

In the above-described exemplary embodiments of the present disclosure, the elements included in the disclosure are expressed in singular or plural forms according to an exemplary embodiment. However, the singular or plural forms are appropriately selected according to a suggested situation for convenience of explanation and are not intended to be limiting. That is, an element expressed by a plural form may be configured as a single element or an element expressed by a singular form may be configured as a plurality of elements.

What is claimed is:

1. A method for operating a terminal in a wireless communication system, the method comprising:
receiving a first message comprising first information indicating at least one peer terminal, wherein the at least one peer terminal is determined based on locations of each of the terminal and the at least one peer terminal;
in response to receiving the;
first message, determining a quality of a channel for a direct path between the terminal and the at least one peer terminal;
transmitting a second message comprising information regarding the quality of the channel;
receiving a third message instructing a path switch from a default path to the direct path based on the quality of the channel; and
communicating with the at least one peer terminal via the direct path by performing the path switch.

2. The method of claim 1, wherein the determining of the quality of the channel is initiated by a request message comprising at least one of resource allocation information necessary for determining the quality of the channel, a resource allocation time, a reference signal code, a measurement report on a condition of the direct path, resource information to be used for transmitting the second message.

3. The method of claim 1, wherein the third message comprises at least one of a Device to Device (D2D) Identifier (ID) to be used in the direct path, a D2D ID of the at least one peer terminal, a subframe offset informing a start point of direct path communication, a D2D bearer ID for using the direct path, or a Packet Data Convergence Protocol (PDCP) sequence number to be used.

4. The method of claim 1, further comprising:
transitioning to an idle state after performing the path switch.

5. The method of claim 1, further comprising:
transmitting, to the at least one peer terminal, a fourth message for requesting to switch the direct path to the default path based on the quality of the channel; and
receiving, from the at least one peer terminal, a fifth message for approving to switch the direct path to the default path based on another quality of the channel measured by the at least one peer terminal.

6. The method of claim 5, further comprising:
transmitting a data packet to a gateway that processes packets, wherein the data packet is a packet that encapsulated a default path indication defined to switch to the default path.

7. The method of claim 6, further comprising:
transitioning to a connected state by performing a network reentry procedure after switching the direct path to the default path.

8. The method of claim 5, further comprising:
receiving a direct path detach message to disable communication with the at least one peer terminal via the direct path.

9. The method of claim 8, wherein the communication with the at least one peer terminal via the direct path is maintained until the direct path detach message is received.

10. The method of claim 1, wherein the direct path is a communication path for the terminal to communicate with the at least one peer terminal directly via the channel, and the default path is a communication path for the terminal to communicate with the at least one peer terminal via at least one base station.

11. The method of claim 1, wherein the quality of the channel comprises at least one of received power of a reference signal, a Signal to Interference Ratio (SIR), and a Signal to Interference and Noise Ratio (SINR).

12. A terminal in a wireless communication system, the terminal comprising:
at least one transceiver configured to receive a first message comprising first information indicating at least one peer terminal, wherein the at least one peer terminal is determined based on locations of each of the terminal and the at least one peer terminal;
a controller configured to, in response to receiving the first message, determine a quality of a channel for a direct path between the terminal and the at least one peer terminal during communicating with the at least one peer terminal via a default path,
wherein the at least one transceiver is further configured to transmit a second message comprising information regarding the quality of the channel and receive a third message instructing a switch from the default path to the direct path based on the quality of the channel;
wherein the controller is further configured to control to communicate with the at least one peer terminal via the direct path by performing the switch.

13. The terminal of claim 12, wherein the determining of the quality of the channel is initiated by a request message comprising at least one of resource allocation information necessary for determining the quality of the channel, a resource allocation time, a reference signal code, a measurement report on a condition of the direct path, resource information to be used for transmitting the second message.

14. The terminal of claim 12, wherein the third message comprises at least one of a Device to Device (D2D) Identifier (ID) to be used in the direct path, a D2D ID of the at least one peer terminal, a subframe offset informing a start point of direct path communication, a D2D bearer ID for using the direct path, or a Packet Data Convergence Protocol (PDCP) sequence number to be used.

15. The terminal of claim 12, wherein the controller is further configured to an idle state after performing the switch.

16. The terminal of claim 12, wherein the controller is further configured to control to:
transmit, to the at least one peer terminal, a fourth message for requesting to switch the direct path to the default path based on the quality of the channel; and
receive, from the at least one peer terminal, a fifth message for approving to switch the direct path to the default path based on another quality of the channel measured by the at least one peer terminal.

17. The terminal of claim 16, wherein the controller is configured to control to:
transmit a data packet to a gateway that processes packets, wherein the data packet is a packet that encapsulated a default path indication defined to switch to the default path.

18. The terminal of claim 17, wherein the controller is further configured to transition to a connected state by performing a network reentry procedure after switching the direct path to the default path.

19. The terminal of claim 16, wherein the controller is configured to control to receive a direct path detach message to disable communication with the at least one peer terminal via the direct path.

20. The terminal of claim 19, wherein the communication with the at least one peer terminal via the direct path is maintained until the direct path detach message is received.

21. The terminal of claim 12, wherein the direct path is a communication path for the terminal to communicate with the at least one peer terminal directly via the channel, and the default path is a communication path for the terminal to communicate with the at least one peer terminal via at least one base station.

22. The terminal of claim 12, wherein the quality of the channel comprises at least one of received power of a reference signal, a Signal to Interference Ratio (SIR), and a Signal to Interference and Noise Ratio (SINR).

23. A method for operating a network entity controlling a path switch between terminals in a wireless communication system, the method comprising:
determining locations of each of a terminal and at least one peer terminal;
transmitting a first message for requesting to determine a quality of channel for a direct path between the terminal and the at least one peer terminal based on the locations;
receiving a second message requesting a path switch from a default path to the direct path based on the quality of the channel; and
transmitting a third message for instructing the terminal to communicate with the at least one peer terminal via the direct path by performing the path switch.

24. The method of claim 23, further comprising:
receiving a fourth message for notifying that the terminal and the at least one peer terminal are a candidate pair capable of communicating via the direct path;
adding the pair of the terminals to device-to-device (D2D) pair candidate information as a candidate; and
transmitting a fifth message for requesting to measure the quality of the channel.

25. The method of claim 24, wherein the adding of the pair of the terminals to the D2D pair candidate information comprises, when the terminal and the at least one peer terminal are served by a same base station or different base stations, adding the pair of the terminal and the at least one peer terminal to the D2D pair candidate information as a candidate.

26. The method of claim 24, wherein the fourth message is one of a message informing that a packet between the terminals received from a gateway for processing packets is not transmitted to an external network, and a message comprising location information of the terminals received from a Mobility Management Entity (MME).

27. The method of claim 24, wherein the fourth message comprises at least one of a bearer identifier (ID), an Evolved Packet System (EPS) bearer ID, and an International Mobile Subscriber Identity (IMSI) of at least one of the terminals.

28. The method of claim 24, wherein the first message comprises at least one of an evolved Node B (eNB) S1 Application Protocol (AP) User Equipment (UE) identifier (ID), a Mobility Management Entity (MME) S1AP UE ID, an Evolved Packet System (EPS) bearer ID, and a Evolved-Universal Terrestrial Radio Access Network (E-UTRAN) Radio Access Bearer (E-RAB) ID of each of the terminal and the at least one peer terminal.

29. The method of claim 23, further comprising:
determining whether to transmit the first message based on at least one of the quality of the channel, a cellular network capacity, a total number of connected terminals, and an estimated throughput.

30. The method of claim 23, wherein the second message comprises at least one of an evolved Node B (eNB) S1 Application Protocol (S1AP) user equipment (UE) identifier (ID), a Mobile Management Entity (MME) S1AP UE ID, an Evolved Packet System (EPS) bearer ID, an Evolved-Universal Terrestrial Radio Access Network (E-UTRAN) Radio Access Bearer (E-RAB) ID of each of the terminals, and the quality of the channel.

31. The method of claim 23, wherein the third message comprises at least one of an evolved Node B (eNB) S1 Application Protocol (S1AP) user equipment (UE) identifier (ID), a Mobile Management Entity (MME) S1AP UE ID, an Evolved Packet System (EPS) bearer ID, and an Evolved-Universal Terrestrial Radio Access Network (E-UTRAN) Radio Access Bearer (E-RAB) ID of each of the terminal and the at least one peer terminal.

32. The method of claim 23, further comprising:
when the path switch is performed, updating device-to-device (D2D) pair candidate information of the terminal and the at least one peer terminal corresponding to a current communication path between the terminal and the at least one peer terminal.

33. The method of claim 32, further comprising:
receiving a sixth message for requesting to detach the direct path; and
transmitting a seventh message for approving of detaching the direct path.

34. The method of claim 23, wherein the direct path is a communication path for the terminal to communicate with the at least one peer terminal directly via the channel, and the default path is a communication path for the terminal to communicate with the at least one peer terminal via at least one base station.

35. The method of claim 23, wherein the quality of the channel comprises at least one of received power of a reference signal, a Signal to Interference Ratio (SIR), and a Signal to Interference and Noise Ratio (SINR).

36. A network entity apparatus controlling a path switch between terminals in a wireless communication system, the network entity apparatus comprising:
a controller configured to determine locations of each of a terminal and at least one peer terminal;
at least one transceiver configured to:
transmit a first message for requesting to determine a quality of channel for a direct path between the terminal and the at least one peer terminal based on the locations;
receive a second message requesting a path switch from a default path to the direct path based on the quality of the channel; and
transmit a third message for instructing the terminal to communicate with the at least one peer terminal via the direct path by performing the path switch.

37. The apparatus of claim 36, wherein the transceiver is configured to control to:
receive a fourth message for notifying that the terminal and the at least one peer terminal are a candidate pair capable of communicating via the direct path;
add the pair of the terminals to device-to-device (D2D) pair candidate information as a candidate; and
transmit a fifth message for requesting to measure the quality of the channel.

38. The apparatus of claim 37, wherein, when the terminal and the at least one peer terminal are served by a same base station or different base stations, the controller is further configured to add the pair of the terminal and the at least one peer terminal to the D2D pair candidate information as a candidate.

39. The network entity of claim 37, wherein the fourth message is one of a message informing that a packet between the terminals received from a gateway for processing packets is not transmitted to an external network, and a message comprising location information of the terminals received from a Mobility Management Entity (MME).

40. The network entity of claim 37, wherein the fourth message comprises at least one of a bearer identifier (ID), an Evolved Packet System (EPS) bearer ID, and an International Mobile Subscriber Identity (IMSI) of at least one of the terminals.

41. The network entity of claim 37, wherein the first message comprises at least one of an evolved Node B (eNB) S1 Application Protocol (AP) User Equipment (UE) identifier (ID), a Mobility Management Entity (MME) S1AP UE ID, an Evolved Packet System (EPS) bearer ID, and a Evolved-Universal Terrestrial Radio Access Network (E-UTRAN) Radio Access Bearer (E-RAB) ID of each of the terminal and the at least one peer terminal.

42. The network entity of claim 36, wherein the controller is configured to:
determine whether to transmit the first message based on at least one of the quality of the channel, a cellular network capacity, a total number of connected terminals, and an estimated throughput.

43. The network entity of claim 36, wherein the second message comprises at least one of an evolved Node B (eNB) S1 Application Protocol (S1AP) user equipment (UE) identifier (ID), a Mobile Management Entity (MME) S1AP UE ID, an Evolved Packet System (EPS) bearer ID, an Evolved-Universal Terrestrial Radio Access Network (E-UTRAN) Radio Access Bearer (E-RAB) ID of each of the terminals, and the quality of the channel.

44. The network entity of claim 36, wherein the third message comprises at least one of an evolved Node B (eNB) S1 Application Protocol (S1AP) user equipment (UE) identifier (ID), a Mobile Management Entity (MME) S1AP UE ID, an Evolved Packet System (EPS) bearer ID, and an Evolved-Universal Terrestrial Radio Access Network (E-UTRAN) Radio Access Bearer (E-RAB) ID of each of the terminal and the at least one peer terminal.

45. The network entity of claim 36, wherein, when the path switch is performed, the controller is further configured to update device-to-device (D2D) pair candidate information of the terminal and the at least one peer terminal corresponding to a current communication path between the terminal and the at least one peer terminal.

46. The network entity of claim 45, wherein the controller is configured to control to receive a sixth message for requesting to detach the direct path, and transmit a seventh message for approving of detaching the direct path.

47. The apparatus of claim 36, wherein the direct path is a communication path for the terminal to communicate with the at least one peer terminal directly via the channel, and the default path is a communication path for the terminal to communicate with the at least one peer terminal via at least one base station.

48. The apparatus of claim 36, wherein the quality of the channel comprises at least one of received power of a reference signal, a Signal to Interference Ratio (SIR), and a Signal to Interference and Noise Ratio (SINR).

* * * * *